(12) United States Patent
Zhang et al.

(10) Patent No.: US 9,996,503 B2
(45) Date of Patent: *Jun. 12, 2018

(54) SIGNAL PROCESSING METHOD AND DEVICE

(71) Applicant: Huawei Technologies Co., Ltd., Shenzhen, Guangdong (CN)

(72) Inventors: Deming Zhang, Guangdong (CN); Haiting Li, Beijing (CN); Anisse Taleb, Guangdong (CN); Jianfeng Xu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/696,091

(22) Filed: Sep. 5, 2017

(65) Prior Publication Data

US 2017/0364479 A1    Dec. 21, 2017

Related U.S. Application Data

(63) Continuation of application No. 15/345,074, filed on Nov. 7, 2016, now Pat. No. 9,792,257, which is a (Continued)

(30) Foreign Application Priority Data

Jan. 10, 2011  (CN) .......................... 2011 1 0004032

(51) Int. Cl.
*G06F 17/14* (2006.01)
*G10L 19/022* (2013.01)
*G10L 19/02* (2013.01)

(52) U.S. Cl.
CPC .......... *G06F 17/142* (2013.01); *G06F 17/141* (2013.01); *G06F 17/147* (2013.01); *G10L 19/022* (2013.01); *G10L 19/0212* (2013.01)

(58) Field of Classification Search
None
See application file for complete search history.

(56) References Cited

U.S. PATENT DOCUMENTS

| 5,845,241 A | 12/1998 | Owechko |
| 6,098,088 A | 8/2000 | He et al. |

(Continued)

FOREIGN PATENT DOCUMENTS

| CN | 101202043 A | 6/2008 |
| CN | 101354700 A | 1/2009 |

(Continued)

OTHER PUBLICATIONS

Gluth, R.; "Regular FFT-related transform kernels for DCT/DST-based polyphase filter banks"; 1991 International Conference on Acoustics, Speech, and Signal Processing (ICASSP-91); Toronto, Ontario, Canada; Apr. 14-17, 1991; 4 pages.

(Continued)

*Primary Examiner* — Michael D. Yaary

(57) ABSTRACT

A method for processing an audio signal, including: sound is converted to an analog audio input signal and converted into a digital audio signal; a windowed time domain signal is obtained and then a twiddled signal is obtained; the twiddled signal is pre-rotated and then an FFT is performed; an in-place fixed rotate compensation is performed on the FFT signal and then an post-rotated is performed; a quantized signal is obtained and then wrote into a bitstream for transmitting or storing.

26 Claims, 8 Drawing Sheets

Related U.S. Application Data continuation of application No. 13/938,834, filed on Jul. 10, 2013, now Pat. No. 9,519,619, which is a continuation of application No. PCT/CN2011/085197, filed on Dec. 31, 2011.

(56) References Cited

U.S. PATENT DOCUMENTS

| | | |
|---|---|---|
| 2001/0028719 A1 | 10/2001 | Hayashi |
| 2005/0015420 A1 | 1/2005 | Gibb et al. |
| 2007/0133389 A1 | 6/2007 | Berkeman et al. |
| 2010/0191791 A1 | 7/2010 | Patel et al. |
| 2011/0185001 A1 | 7/2011 | Zhang et al. |

FOREIGN PATENT DOCUMENTS

| | | |
|---|---|---|
| CN | 101521649 A | 9/2009 |
| CN | 101582264 A | 11/2009 |
| CN | 101930425 A | 12/2010 |
| EP | 2290938 A1 | 3/2011 |
| JP | 2001296343 A | 10/2001 |
| JP | 2010124324 A | 6/2010 |
| JP | 2012527708 A | 11/2012 |
| WO | 2010028440 A1 | 3/2010 |
| WO | 2010148743 A1 | 12/2010 |

OTHER PUBLICATIONS

Rabiner, L. "On the Use of Symmetry in FFT Computation"; IEEE Transactions on Acoustics, Speech, and Signal Processing; vol. ASSP-27, No. 3; Jun. 1979; 8 pages.

Duhamel et al.; "Fast Fourier Transforms: A Tutorial Review and a State of the Art"; Signal Processing 19; Elsevier Science Publishers B.V.; Apr. 1990; 42 pages.

Zhang et al.; "Low Complexity Transform—Evolved DCT"; 14th IEEE International Conference on Computational Science and Engineering; 2011; 8 pages.

"Series G: Transmission Systems and Media, Digital Systems and Networks; Digital Terminal Equipments—Coding of Voice and Audio Signals; Frame error robust narrow-band and wideband embedded variable bit-rate coding of speech and audio from 8-32 kbits/s; Amendment 2: New Annex B on superwideband scalable extension for ITU-T G.718 and corrections to main body fixed-point C-code and description text"; International Telecommunication Union; ITU-T G.718 Amendment 2; Mar. 2010; 62 pages.

"Series G: Transmission Systems and Media, Digital Systems and Networks; Digital Terminal Equipments—Coding of Voice and Audio Signals; G.729-based embedded variable bit-rate coder: An 8-32 kbit/s scalable wideband coder bitstream interoperable with G.729; Amendment 6: New Annex E on superwideband scalabel extension"; International Telecommunication Union; ITU-T G.729.1 Amendment 6; Mar. 2010; 80 pages.

Taleb et al.; "G.719: The First ITU-T Standard for High-Quality Conversational Fullband Audio Coding"; IEEE Communications Magazine; Oct. 2009; 7 pages.

SIGNAL PROCESSING METHOD AND DEVICE

CROSS-REFERENCE TO RELATED APPLICATIONS

This application is a continuation of U.S. patent application Ser. No. 15/345,074, filed on Nov. 7, 2016, which is a continuation of U.S. patent application Ser. No. 13/938,834, filed on Jul. 10, 2013, now U.S. Pat. No. 9,519,619, which is a continuation of International Application No. PCT/CN2011/085197, filed on Dec. 31, 2011. The International Application claims priority to Chinese Patent Application No. 201110004032.5, filed on Jan. 10, 2011. All of the afore-mentioned patent applications are hereby incorporated by reference in their entireties.

TECHNICAL FIELD

The present invention relates to the field of digital signal processing technologies, and in particular, to a signal processing method and device.

BACKGROUND

In the field of digital communications, transmission of speeches, pictures, audios and videos has a very broad application requirement, such as cell phone communications, audio/video conferences, broadcast television, and multimedia entertainment. In order to reduce the resource occupied during storage or transmission of audio/video signals, audio/video compression coding technologies emerge. Many different technique branches emerge during the development of the audio/video compression coding technologies, where a technique of transforming a signal from a time domain to a frequency domain and then performing coding processing, also referred to as a transform-domain coding technique, is widely applied due to desired compression characteristics.

Many methods for transforming the signal from the time domain to the frequency domain exist in the transform-domain coding technique, where the time-frequency transform such as Fourier transform (Discrete Fourier transform, DFT), Discrete Cosine Transform (Discrete Cosine Transform, DCT), Discrete sine transform (Discrete sine transform, DST) and Modified Discrete Cosine Transform (Modified Discrete Cosine Transform, MDCT) has broad applications, especially in fields such as spectrum analysis, picture coding and speech coding. The signal that has undergone the time-frequency transform may be compression coded through a quantization technology, and may also be coded by using other parameter audio coding methods, thereby achieving the objective of data compression.

However, the inventor finds that, performing DCT-IV or MDCT forward transform and inverse transform directly according to transform formulas will result in high computational complexity and storage amount, and therefore, providing a time domain-frequency domain transform method with low storage amount becomes an urgent need.

SUMMARY

Embodiments of the present invention aim to provide a data processing method, so as to reduce the storage amount of time domain-frequency domain transform processing during audio/video coding.

A data processing method according to an embodiment of the present invention includes:
twiddling input data, so as to obtain twiddled data;
pre-rotating the twiddled data by using a symmetric rotate factor, where the rotate factor is $a \cdot W_{4L}^{2p+1}$, $p=0, \ldots, L/2-1$, and a is a constant;
performing a Fast Fourier (Fast Fourier Transform, FFT) transform of L/2 point on the pre-rotated data, where L is the length of the input data;
post-rotating the data that has undergone the FFT transform by using a symmetric rotate factor, where the rotate factor is $b \cdot W_{4L}^{2q+1}$, $q=0, \ldots, L/2-1$, and b is a constant; and
obtaining output data.

A time-domain to frequency-domain signal processing method according to another embodiment of the present invention includes:
pre-processing time domain data, so as to obtain pre-processed data;
pre-rotating the pre-processed data by using a rotate factor $a \cdot W_N^{n+0.5}$;
performing Fast Fourier Transform of N/4 point on the pre-rotated data; and
post-rotating the data that has undergone the Discrete Fourier Transform by using a rotate factor $b \cdot W_N^{k+0.5}$ so as to obtain frequency domain data;
where, before the obtaining the frequency domain data, the method further includes: a step of performing fixed rotate compensation by using a fixed rotate compensation factor; the a and b are constants, the N is the length of the time domain data, and $$W_N = e^{-j\frac{2\pi}{N}}.$$

A frequency-domain to time-domain signal processing method according to another embodiment of the present invention includes:
pre-processing frequency domain data, so as to obtain pre-processed data;
pre-rotating the pre-processed data by using a rotate factor $c \cdot W_N^{k+0.5}$;
performing Fast Fourier Transform of N/4 point on the pre-rotated data;
post-rotating the data that has undergone the Fast Fourier Transform by using a rotate factor $d \cdot W_N^{n+0.5}$; and
post-processing the post-rotated data, so as to obtain time domain data;
where, before the obtaining the time domain data, the method further includes: a step of performing fixed rotate compensation by using a fixed rotate compensation factor; the c and d are constants, the N is twice the length of the frequency domain data, and $$W_N = e^{-j\frac{2\pi}{N}}.$$

A signal processing device according to another embodiment of the present invention includes:
a twiddle unit, configured to twiddle input data, so as to obtain twiddled data;
a pre-rotate unit, configured to pre-rotate the twiddled data by using a symmetric rotate factor, where the rotate factor is $a \cdot W_{4L}^{2p+1}$, $p=0, \ldots, L/2-1$, and a is a constant;

a transform unit, configured to perform a Fast Fourier (Fast Fourier Transform, FFT) transform of L/2 point on the pre-rotated data, where L is the length of the input data;

a post-rotate unit, configured to post-rotate the data that has undergone the FFT transform by using a symmetric rotate factor, where the rotate factor is $b \cdot W_{4L}^{2q+1}$, q=0, . . . , L/2−1, and b is a constant; and an output unit, configured to obtain output data.

A time-domain to frequency-domain signal processing device according to another embodiment of the present invention includes:

a pre-processing unit, configured to pre-process time domain data, so as to obtain pre-processed data;

a pre-rotate unit, configured to pre-rotate the pre-processed data by using a rotate factor $a \cdot W_N^{n+0.5}$;

a transform unit, configured to perform Fast Fourier Transform of N/4 point on the pre-rotated data;

a post-rotate unit, configured to post-rotate the data after the Discrete Fourier Transform by using a rotate factor $b \cdot W_N^{k+0.5}$, so as to obtain frequency domain data; wherein, the device further includes:

a fixed compensation unit, configured to perform fixed rotate compensation by using a fixed rotate compensation factor; the a and b are constants, the N is the length of the time domain data, and $$W_N = e^{-j\frac{2\pi}{N}}.$$

A frequency-domain to time-domain processing device according to another embodiment of the present invention includes:

a pre-processing unit, configured to pre-process frequency domain data, so as to obtain pre-processed data;

a pre-rotate unit, configured to pre-rotate the pre-processed data by using a rotate factor $c \cdot W_N^{k+0.5}$;

a transform unit, configured to perform Fast Fourier Transform of N/4 point on the pre-rotated data;

a post-rotate unit, configured to post-rotate the data that has undergone the Fast Fourier Transform by using a rotate factor $d \cdot W_N^{n+0.5}$; where, the device further includes:

a fixed compensation unit, configured to perform fixed rotate compensation by using a fixed rotate compensation factor; the c and d are constants, the N is twice the length of the frequency domain data, and $$W_N = e^{-j\frac{2\pi}{N}}.$$

In the embodiments of the present invention, the rotate factors used in the pre-rotate and post-rotate steps have symmetry, thereby reducing the storage amount of the data. At the same time, the FFT may accelerate the speed of the transform, and reduce the computational complexity.

BRIEF DESCRIPTION OF THE DRAWINGS

To describe the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

Figure 1:
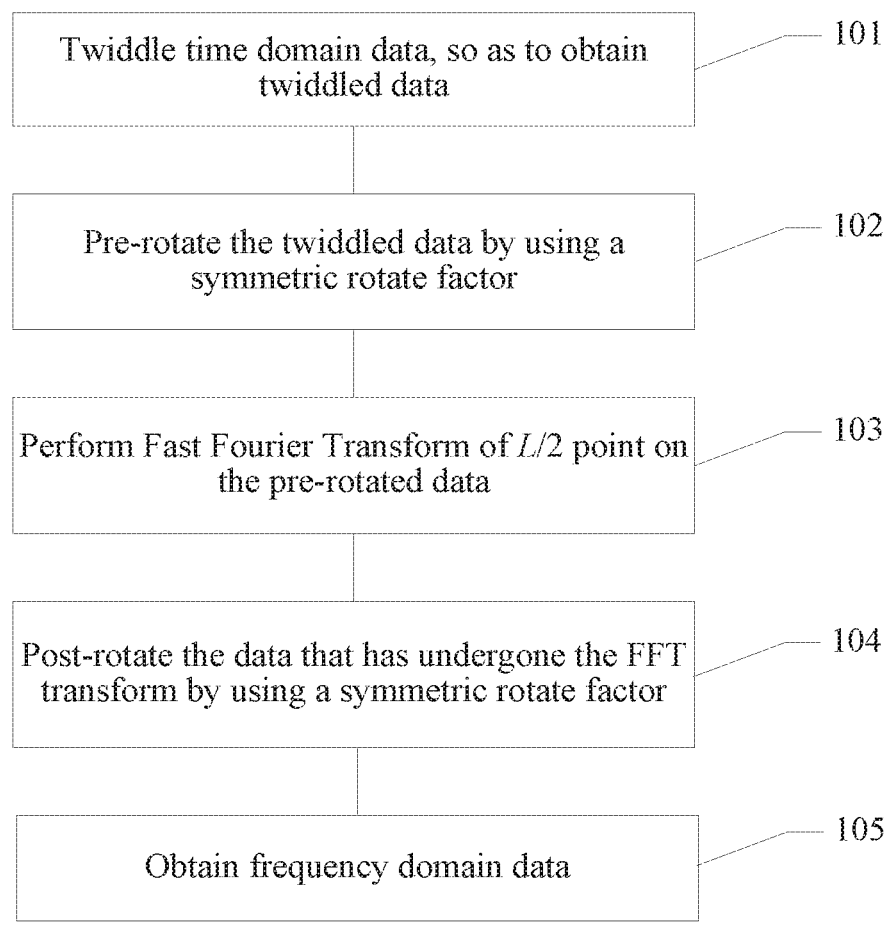
FIG. 1 is a schematic flow chart of an embodiment of a time-domain to frequency-domain DCT-IV transform method provided in the present invention.

The technical solutions of the present invention are clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

In the field of digital signal processing, audio codec and video codec are widely applied in various electronic apparatuses, such as a mobile phone, a wireless device, a personal data assistant (PDA), a handheld or portable computer, a GPS receiver/navigation device, a camera, an audio/video player, a video camera, a video recorder, and a monitoring apparatus. Generally, the electronic apparatus includes an audio coder or audio decoder, the audio coder or decoder may be implemented directly by a digital circuit or chip such as a DSP (digital signal processor), or be implemented by software codes driving a processor to execute a process in the software codes.

For example, there is an audio coder. The audio coder first performs a framing processing on an input signal, so as to obtain time domain data 20 ms per frame; performs a windowing processing on the time domain data, so as to obtain a windowed signal; performs frequency domain transform on the windowed time domain signal, for example, MDCT transform or DCT-IV transform so as to transform the signal from a time domain signal to a frequency domain signal; performs a band splitting processing on the frequency domain signal, so as to obtain the bandsplit frequency domain signal; calculates energy of each sub-band signal, performs quantization coding on the sub-band energy, and transmits it to a decoder; next, performs self-adaptive bit allocation based on auditory masking effect according to the quantized sub-band energy, so as to obtain the number of bits for quantization coding of each sub-band; and finally performs a normalization processing on frequency points in each sub-band, performs through a vector quantization technique, according to the allocated number of bits for coding, vector quantization on the frequency points in the sub-band that are undergone the normalization processing, so as to obtain a vector quantized code book index, codes it and then transmits to the decoder. After receiving a compressed code stream transmitted from the coder, the decoder searches for a code book index of energy of each sub-band signal from the code stream according to a corresponding decoding step, and obtains a quantization value of the energy of each sub-band signal; adopts a bit allocation technique consistent with the that of the coder according to the quantization values, so as to obtain the number of bits allocated for each sub-band; according to the number of bits allocated for each sub-band, and the code book index of vector quantization of each sub-band that is acquired from the code stream, obtains a normalization frequency domain coefficient after quantization of each sub-band; performs a denormalization processing on the normalization frequency domain coefficient after quantization of each sub-band according to the quantization value of the energy of each sub-band signal, so as to obtain a complete frequency domain signal; transforms the signal from the frequency domain to the time domain by adopting an inverse transform corresponding to the transform used by the coder on the frequency domain signal obtained through decoding, and post-processes the time domain signal to obtain a composite signal, that is, an output signal of the decoder. The time domain to frequency domain signal processing method may also be referred to as forward transform, and the frequency domain to time domain signal processing method may also be referred to as inverse transform.

The DCT, as spatial transform, has the largest characteristic of having energy compaction, which results in that a coding system based on the DTC has desired compression performance. A type 4 DCT (DCT-IV) is often used in audio and video data compression. A formula of the DCT-IV transform is:

$$y(k) = \sum_{n=0}^{L-1} \tilde{x}(n) \cos\left[\left(n+\frac{1}{2}\right)\left(k+\frac{1}{2}\right)\frac{\pi}{L}\right]$$

$$k = 0, 1, 2, \ldots, L-1,$$

where, k is an integer from 0 to L−1. It can be seen that, performing the DCT-IV forward transform and inverse transform directly according to the transform formula will result in high computational complexity and large storage amount. The DCT-IV transform is widely applied in the field of real-time communications, especially in audio coding, so reducing the storage amount of the DCT-IV transform method becomes an urgent need.

Referring to FIG. 1, a signal processing method provided in an embodiment of the present invention is used to implement time-domain to frequency-domain DCT-IV transform during a coding procedure, so as to reduce the storage amount in the transform. The method includes the following steps:

S101: Twiddle time domain data, so as to obtain twiddled data.

It is assumed that $\tilde{x}(n)$ is data requiring DCT-IV transform, and the data may be data undergone pre-processing steps such as windowing. Twiddle the data $\tilde{x}(n)$, so as to obtain twiddled data z(p);

$$z(p) = \tilde{x}(2p) + j \cdot \tilde{x}(L-1-2p), p=0,1,2,\ldots,L/2-1$$

S102: Pre-rotate the twiddled data by using a symmetric rotate factor, where the rotate factor is $a \cdot W_{4L}^{2p+1}$, p=0, 1, 2, . . . , L/2−1, and a is a constant.

Pre-rotate the twiddled data z(p), where the rotate factor is $a \cdot W_{4L}^{2p+1}$, p=0, 1, 2, . . . , L/2−1.

$$W_{4L}^{2p+1} = \cos\frac{2\pi(2p+1)}{4L} - j\sin\frac{2\pi(2p+1)}{4L},$$

$$p = 0, 1, 2, \ldots, \frac{L}{2}-1,$$

and a is a constant.

$W_{4L}^{2p+1}$ in the rotate factor may also be expressed in the following form:

$$W_{4L}^{2p+1} = \cos\frac{2\pi(2p+1)}{4L} - j\sin\frac{2\pi(2p+1)}{4L},$$

$$p = 0, 1, 2, \ldots, \frac{L}{2}-1,$$

which satisfies conditions of $$\cos\frac{2\pi(2(L/2-1-q)+1)}{4L} = \cos\frac{2\pi(L-(2q+1))}{4L} = \sin\frac{2\pi(2q+1)}{4L},$$

$$q = 0, 1, 2, \ldots, L/4-1 \text{ and}$$

$$\sin\frac{2\pi(2(L/2-1-q)+1)}{4L} = \sin\frac{2\pi(L-(2q+1))}{4L} = \cos\frac{2\pi(2q+1)}{4L},$$

$$q = 0, 1, 2, \ldots, L/4-1,$$

and therefore, in the specific implementation, only one of a cosine data table $$a \cdot \cos\frac{2\pi(2p+1)}{4L}, p = 0, 1, 2, \ldots, L/2-1$$

or a sine data table $$a \cdot \sin\frac{2\pi(2p+1)}{4L}, p = 0, 1, 2, \ldots, L/2-1$$

of L/2 point needs to be stored.

S103: Perform Fast Fourier Transform (Fast Fourier Transform, FFT) of L/2 point on the pre-rotated data.

S104: Post-rotate the data that has undergone the FFT transform by using a symmetric rotate factor, where the rotate factor is $b \cdot W_{4L}^{2q+1}$, q=0, . . . , L/2−1, and b is a constant.

Post-rotate the data that has undergone the FFT transform, where the rotate factor is $b \cdot W_{4L}^{2q+1}$, q=0, . . . , L/2−1, that is, q is an integer between 0 and L/2−1.

$$W_{4L}^{2q+1} = \cos\frac{2\pi(2q+1)}{4L} - j\sin\frac{2\pi(2q+1)}{4L},$$

$$q = 0, 1, 2, \ldots, L/2 - 1,$$

and b is a constant.

$W_{4L}^{2q+1}$ in the rotate factor may also be expressed in the following form:

$$W_{4L}^{2q+1} = \cos\frac{2\pi(2q+1)}{4L} - j\sin\frac{2\pi(2q+1)}{4L},$$

$$q = 0, 1, 2, \ldots, L/2 - 1,$$

and therefore, in the specific implementation, only one of a cosine data table $$b \cdot \cos\frac{2\pi(2q+1)}{4L}, q = 0, 1, 2, \ldots, L/2 - 1$$

or a sine data table $$b \cdot \sin\frac{2\pi(2p+1)}{4L}, q = 0, 1, 2, \ldots, L/2 - 1$$

of L/2 point needs to be stored.

When a product of constants a and b of the two rotate factors in the forward transform and a product of constants c and d of the two rotate factors in the inverse transform is equal to 2/L, output data of the forward transform is used directly as input data of the inverse transform, and a result of the inverse transform may finish perfect reconstruction, that is, restore to obtain the data before the forward transform. Generally, in actual operations, the perfect reconstruction is not necessarily to be implemented. To implement the perfect reconstruction, values of the constants a and b are selected as long as a product of the product of a and b in the forward transform and the product of c and d in the inverse transform is equal to 2/L. In an embodiment, the product of a and b is equal to $$\frac{\sqrt[2]{2}}{\sqrt[2]{L}},$$

for example, $$a = b = \frac{\sqrt[4]{2}}{\sqrt[4]{L}}$$

may be selected, and in this way, after the pre-rotate and post-rotate, only one cosine data table $$\frac{\sqrt[4]{2}}{\sqrt[4]{L}}\cos\frac{2\pi(2p+1)}{4L}, p = 0, 1, 2, \ldots, L/2 - 1$$

of L/2 point needs to be stored.

S105: Obtain frequency domain data.

A real part of the post-rotated data is expressed as y(2q), which is the odd number frequency of the frequency domain data; and an opposite number of an imaginary part of the post-rotated data is expressed as y(L−1−2q), which is the even number frequency of the frequency domain data.

$$\begin{cases} y(2q) = \text{Re}\{\overline{Z}(q)\} \\ y(L-1-2q) = -\text{Im}\{\overline{Z}(q)\} \end{cases}, q = 0, 1, 2, \ldots, L/2 - 1$$

where $$\overline{Z}(q) = W_{4L}^{2q+1}\sum_{p=0}^{2/L-1}\{z(p) * W_{4L}^{2p+1}\}W_{L/2}^{pq}, p, q = 0, \ldots, L/2 - 1$$

is the post-rotated data.

The original DCT-IV transform formula $$y(k) = \sum_{n=0}^{L-1}\tilde{x}(n)\cos\left[\left(n + \frac{1}{2}\right)\left(k + \frac{1}{2}\right)\frac{\pi}{L}\right],$$

$k = 0, 1, 2, \ldots, L - 1$ is equivalent to:

$$\begin{cases} y(2q) = \text{Re}\{\overline{Z}(q)\} \\ y(L-1-2q) = -\text{Im}\{\overline{Z}(q)\} \end{cases}, q = 0, \ldots, L/2 - 1$$

where, $$\overline{Z}(q) = W_{2L}^{q}\sum_{p=0}^{L/2-1}\{W_{8L}^{4p+1}z(p)\}W_{L/2}^{pq}, p, q = 0, \ldots, L/2 - 1$$

$$z(p) = \tilde{x}(2p) + j\tilde{x}(L - 1 - 2p), p = 0, \ldots, L/2 - 1,$$

$$W_N = e^{-j\frac{2\pi}{N}},$$

this may be rewritten as:

$$\overline{Z}(q) = W_{4L}^{-1} * W_{4L}^{2q+1}\sum_{p=0}^{L/2-1}\{W_{8L}^{-1}z(p) * W_{4L}^{2p+1}\}W_{L/2}^{pq},$$

$$p, q = 0, 1, 2, \ldots, L/2 - 1$$

where, in order to simplify the computation, $W_{4L}^{-1}$ may be taken to be approximate to 1, and $W_{8L}^{-1}$ may be taken to be approximate to 1. $\begin{cases} y(2q) = \text{Re}\{\overline{Z}(q)\} \\ y(L-1-2q) = -\text{Im}\{\overline{Z}(q)\} \end{cases}, q = 0, 1, 2, \ldots, L/2 - 1$ where $z(p) = \tilde{x}(2p) + j\tilde{x}(L - 1 - 2p), p = 0, 1, 2, \ldots, L/2 - 1$ $$W_{4L}^{2q+1} = \cos\frac{2\pi(2q+1)}{4L} - j\sin\frac{2\pi(2q+1)}{4L},$$

$$q = 0, 1, 2, \ldots, L/2 - 1$$

$$W_{4L}^{2q+1} = \cos\frac{2\pi(2p+1)}{4L} - j\sin\frac{2\pi(2p+1)}{4L},$$

$$p = 0, 1, 2, \ldots, L/2 - 1$$

The rotate factor $W_{4L}^{2q+1}$ is symmetric, that is, $W_{4L}^{2q+1}$ satisfies $$\cos\frac{2\pi(2(L/2-1-q)+1)}{4L} = \cos\frac{2\pi(L-(2q+1))}{4L} = \sin\frac{2\pi(2q+1)}{4L},$$

-continued $q = 0, 1, 2, \ldots, L/4 - 1$ $\sin\frac{2\pi(2(L/2 - 1 - q) + 1)}{4L} = \sin\frac{2\pi(L - (2q + 1))}{4L} = \cos\frac{2\pi(2q + 1)}{4L},$ $q = 0, 1, 2, \ldots, L/4 - 1$ Likewise, the rotate factor $W_{4L}^{2p+1}$ also satisfies the symmetry.

In this embodiment, the rotate factors used in the pre-rotate and post-rotate steps have symmetry. During implementation, only a cosine table of L/2 point or a sine table of L/2 point needs to be stored for the $W_{4L}^{2q+1}$, so as to reduce the storage amount of the data. At the same time, using the FFT may accelerate the speed of the DCT-IV transform, and reduce the computational complexity. Further, skipping the step of fixed rotate may further reduce the computational complexity in the situation that the transform satisfies the reconstruction characteristic.

In another embodiment, before the obtaining of the frequency domain data, the method further includes a step of performing fixed rotate compensation by using a fixed rotate compensation factor. In the transform formula, the fixed rotate compensation and operation of other part are of a multiplication relationship, so the fixed rotate compensation may be performed once or more according to the communicative property of multiplication, and the execution order of the fixed rotate compensation may be any order before the obtaining of the frequency domain data.

In an embodiment, $W_{8L}^{-3}$ is used to perform the fixed rotate compensation once; and the step of performing the fixed rotate compensation may be performed before or after the pre-rotate, and may also be performed before or after the post-rotate. When the compensation is executed once, the fixed rotate compensation factor may be $W_{8L}^{-3}$. In order to further reduce the computational complexity, some approximate values may be used to replace $W_{8L}^{-3}$ to perform the fixed rotate compensation.

$W_{8L}^{-3} = e^{-j\frac{2\pi(-3)}{8L}} = e^{j\frac{3\pi}{4L}},$ and therefore, the approximation may be performed with Taylor series expansion, for example, a result of first order Taylor series expansion $1 + j\left(\frac{3\pi}{4L}\right)$ is used as the approximate value of $W_{8L}^{-3}$, where, $1 + j\left(\frac{3\pi}{4L}\right)$ represents a complex number of which a real part and an imaginary part are 1 and $\left(\frac{3\pi}{4L}\right),$ respectively.

In another embodiment, when the fixed rotate compensation is performed twice, the fixed rotate compensation factors may be $W_{8L}^{-1}$ and $W_{4L}^{-1}$, and may also be approximate values thereof. The compensation factor of the fixed rotate compensation performed for the first time may be any one of $W_{8L}^{-1}$ and $W_{4L}^{-1}$, and the compensation factor of the fixed rotate compensation performed for the second time may be the other one of $W_{8L}^{-1}$ and $W_{4L}^{-1}$. The fixed rotate compensation performed for the first time may be performed before or after the pre-rotate, and the fixed rotate compensation performed for the second time may be performed before or after the post-rotate. In order to further reduce the computational complexity, some approximate values, such as Taylor series expansion, may be used to replace $W_{8L}^{-1}$ or $W_{4L}^{-1}$ to perform the fixed rotate compensation. For example, a result of first order Taylor series expansion $1 + j\left(\frac{\pi}{4L}\right)$ is used as the approximate value of $W_{8L}^{-1}$, and a result of first order Taylor series expansion $1 + j\left(\frac{\pi}{2L}\right)$ is used as the approximate value of $W_{4L}^{-1}$.

Obviously, due to the communicative property of multiplication, the fixed rotate compensation may be performed for three or more times, and a product of compensation factors may be $W_{8L}^{-3}$, or at least one compensation factor is an approximate value of at least factor of which the product is $W_{8L}^{-3}$. The factor of the fixed rotate compensation may also be 1.

In this embodiment, the step of fixed rotate compensation is added, so that it is ensured that data obtained after the transform consists with the data obtained after the original DCT-IV transform, thereby improving the accuracy of the DCT-IV transform.

In addition, the inverse transform of the DCT-IV has steps substantially the same as those in the forward transform, only except that in the inverse transform, frequency domain data is first twiddled, time domain data is obtained after the final transform, and constants a and b in the rotate factors are changed to constants c and d.

Figure 2:
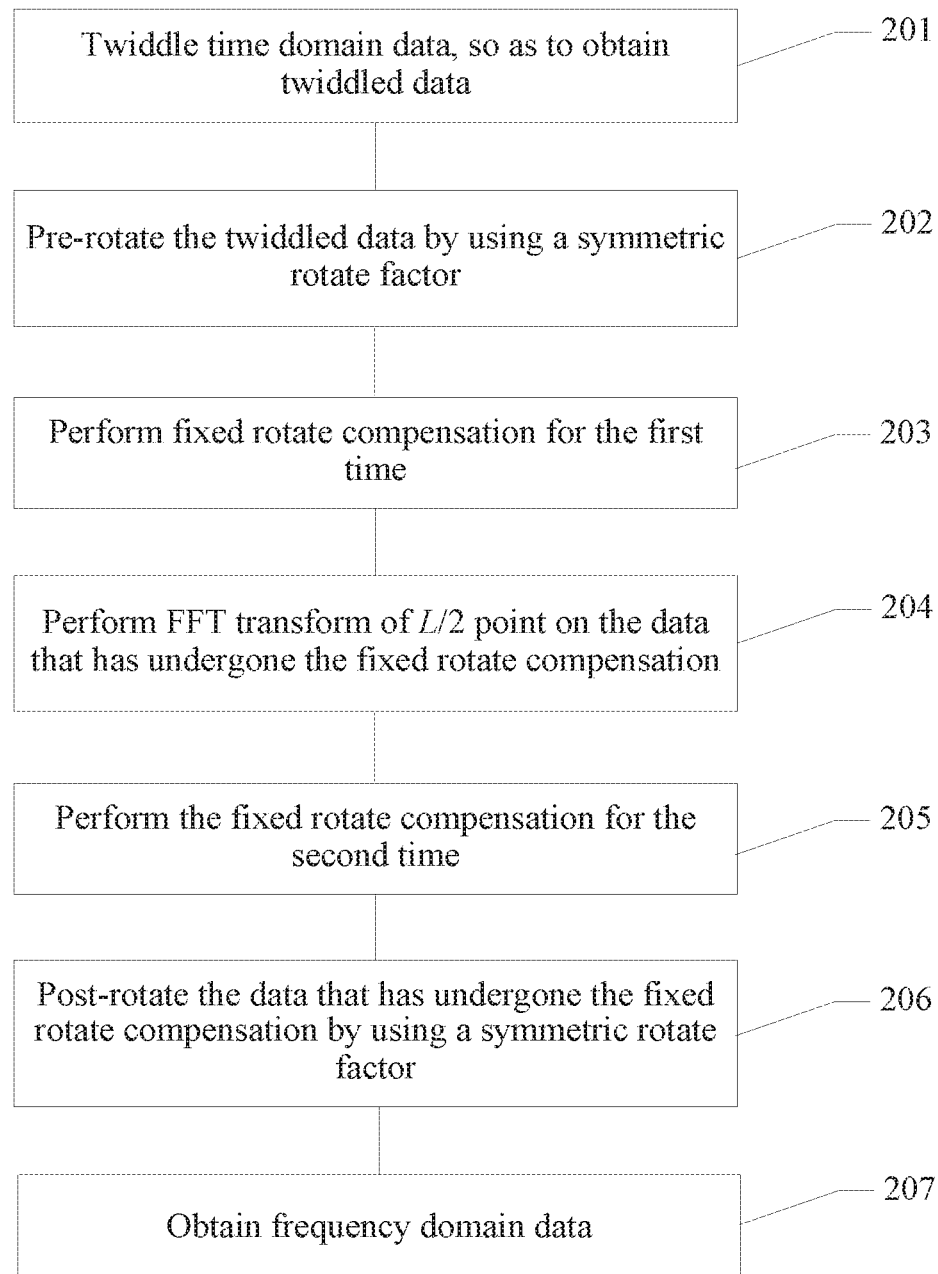
FIG. 2 is a schematic flow chart of another embodiment of a time-domain to frequency-domain DCT-IV transform method provided in the present invention.

Referring to FIG. 2, a signal processing method provided in an embodiment of the present invention is used to implement time-domain to frequency-domain DCT-IV transform during a coding procedure, so as to reduce the storage amount in the transform. The method includes the following steps:

S201: Twiddle time domain data, so as to obtain twiddled data.

It is assumed that x̃(n) is data requiring DCT-IV transform, and the data may be data undergone pre-processing steps such as windowing. Twiddle the data x̃(n), so as to obtain twiddled data z(p);

$z(p) = \tilde{x}(2p) + j\cdot\tilde{x}(L-1-2p), p=0,1,2,\ldots,L/2-1$

S202: Pre-rotate the twiddled data by using a symmetric rotate factor, where the rotate factor is $a\cdot W_{4L}^{2p+1}$, p=0, 1, 2, ..., L/2−1, and a is a constant.

Pre-rotate the twiddled data z(p), where the rotate factor is $a\cdot W_{4L}^{2p+1}$, and p=0, 1, 2, ..., L/2−1.

$$W_{4L}^{2p+1} = \cos\frac{2\pi(2p+1)}{4L} - j\sin\frac{2\pi(2p+1)}{4L},$$
$$p = 0, 1, 2, \ldots, \frac{L}{2} - 1,$$

and a is a constant.

$W_{4L}^{2p+1}$ in the rotate factor may also be expressed in the following form:

$$W_{4L}^{2p+1} = \cos\frac{2\pi(2p+1)}{4L} - j\sin\frac{2\pi(2p+1)}{4L},$$
$$p = 0, 1, 2, \ldots, \frac{L}{2} - 1$$

which satisfies conditions of $$\cos\frac{2\pi\left(2\left(\frac{L}{2}-1-q\right)+1\right)}{4L} = \cos\frac{2\pi(L-(2q+1))}{4L} = \sin\frac{2\pi(2q+1)}{4L},$$
$$q = 0, 1, 2, \ldots, \frac{L}{4} - 1 \text{ and}$$

$$\sin\frac{2\pi\left(2\left(\frac{L}{2}-1-q\right)+1\right)}{4L} = \sin\frac{2\pi(L-(2q+1))}{4L} = \cos\frac{2\pi(2q+1)}{4L},$$
$$q = 0, 1, 2, \ldots, \frac{L}{4} - 1,$$

and therefore, in the specific implementation, only one of a cosine data table $$a \cdot \cos\frac{2\pi(2p+1)}{4L}, p = 0, 1, 2 \ldots, \frac{L}{2} - 1$$

or a sine data table $$a \cdot \sin\frac{2\pi(2p+1)}{4L}, p = 0, 1, 2 \ldots, \frac{L}{2} - 1$$

of L/2 point needs to be stored.

S203: Perform fixed rotate compensation for the first time.

Perform the fixed rotate compensation on the pre-rotated data, and a fixed rotate compensation factor is $W_{8L}^{-1}$. In order to further reduce the computational complexity, some approximate values, such as Taylor series expansion, may be used to replace $W_{8L}^{-1}$ to perform the fixed rotate compensation. For example, a result of first order Taylor series expansion $$1 + j\left(\frac{\pi}{4L}\right)$$

is used as the approximate value of $W_{8L}^{-1}$ to perform the fixed rotate compensation.

S204: Perform. FFT transform of L/2 point on the data that has undergone the fixed rotate compensation.

S205: Perform the fixed rotate compensation for the second time.

The data that has undergone the FFT transform is multiplied with $W_{4L}^{-1}$ to perform the fixed rotate compensation, or the data that has undergone the FFT transform is multiplied with an approximate value of $W_{4L}^{-1}$ to perform the fixed rotate compensation, and the approximate value may be obtained by using the Taylor series expansion of $W_{4L}^{-1}$, for example, a result of first order Taylor series expansion $$1 + j\left(\frac{\pi}{2L}\right)$$

is used as the approximate value of $W_{4L}^{-1}$.

S206: Post-rotate the data that has undergone the fixed rotate compensation by using a symmetric rotate factor, where the rotate factor is $b \cdot W_{4L}^{2q+1}$, $q=0, 1, 2, \ldots, L/2-1$.

$$W_{4L}^{2q+1} = \cos\frac{2\pi(2q+1)}{4L} - j\sin\frac{2\pi(2q+1)}{4L}, q = 0, 1, 2, \ldots, \frac{L}{2} - 1,$$

and b is a constant.

$W_{4L}^{2q+1}$ in the rotate factor may also be expressed in the following form:

$$W_{4L}^{2q+1} = \cos\frac{2\pi(2q+1)}{4L} - j\sin\frac{2\pi(2q+1)}{4L}, q = 0, 1, 2, \ldots, \frac{L}{2} - 1,$$

and therefore, in the specific implementation, only one of a cosine data table $$b \cdot \cos\frac{2\pi(2q+1)}{4L}, q = 0, 1, 2 \ldots, \frac{L}{2} - 1$$

or a sine data table $$b \cdot \sin\frac{2\pi(2p+1)}{4L}, q = 0, 1, 2, \ldots, \frac{L}{2} - 1$$

of L/2 point needs to be stored.

To implement the perfect reconstruction, values of the constants a and b are selected as long as a product of the product of constants a and b of the two rotate factors in the forward transform and the product of constants c and d of the two rotate factors in the inverse transform is equal to 2/L. In an embodiment, the product of a and b is equal to $$\frac{\sqrt[2]{2}}{\sqrt[2]{L}},$$

and the product of c and d is also equal to $$\frac{\sqrt[2]{2}}{\sqrt[2]{L}}.$$

In another embodiment, the product of a and b is equal to 1, and the product of c and d is equal to 2/L. In another embodiment, $$a = b = \frac{\sqrt[4]{2}}{\sqrt[4]{L}}$$

is selected, and in this way, after the pre-rotate and post-rotate, only one Cosine data table $$\frac{\sqrt[4]{2}}{\sqrt[4]{L}} \cos \frac{2\pi(2p+1)}{4L}, p = 0, 1, 2, \ldots, \frac{L}{2} - 1$$

of L/2 point needs to be stored.

S207: Obtain frequency domain data that has undergone the transform.

A real part of the post-rotated data is expressed as y(2q), which is the odd number frequency of the frequency domain data; and an opposite number of an imaginary part of the post-rotated data is expressed as y(L−1−2q), which is the even number frequency of the frequency domain data.

$$\begin{cases} y(2q) = \text{Re}\{\overline{Z}(q)\} \\ y(L-1-2q) = -\text{Im}\{\overline{Z}(q)\} \end{cases}, q = 0, 1, 2, \ldots, L/2 - 1$$

where $\overline{Z}(q) = W_{4L}^{-1} * W_{4L}^{2q+1} \sum_{p=0}^{L/2-1} \{W_{8L}^{-1} z(p) * W_{4L}^{2p+1}\} W_{L/2}^{pq}$, $p, q = 0, \ldots, L/2 - 1$, or $\overline{Z}(q) = (1 + j\frac{\pi}{2L}) * W_{4L}^{2q+1} \sum_{p=0}^{L/2-1} \{(1 + j\frac{\pi}{4L}) * z(p) * W_{4L}^{2p+1}\} W_{L/2}^{pq}$, $p, q = 0, \ldots, L/2 - 1$, which is the post-rotated data.

It should be noted that, the step of performing the fixed rotate compensation by using $W_{8L}^{-1}$ may not only be performed after the pre-rotate, and may also be performed before the pre-rotate, and the step of performing the fixed rotate compensation by using $W_{4L}^{-1}$ may not only be performed before the post-rotate, and may also be performed after the post-rotate. In addition, in the transform formula, the fixed rotate compensation performed two times and the operation of other part are of a multiplication relationship, so the communicative property of multiplication is applicable, and therefore the step of performing the fixed rotate compensation by using $W_{8L}^{-1}$ may be exchanged with the step $W_{4L}^{-1}$ of performing the fixed rotate compensation by using.

In this embodiment, the steps for performing the fixed rotate compensation performed twice are performed, so that it is ensured that input data of the FFT transform consists with the input data of the FFT in the original DCT-IV transform, and it is also ensured that data obtained after the transform consists with the data obtained after the original DCT-IV transform, thereby improving the accuracy of the DCT-IV transform.

In addition, the inverse transform of the DCT-IV has steps substantially the same as those in the forward transform, only except that in the inverse transform, frequency domain data is first twiddled, time domain data is obtained after the final transform, and constants a and b in the rotate factors are changed to constants c and d.

Figure 3:
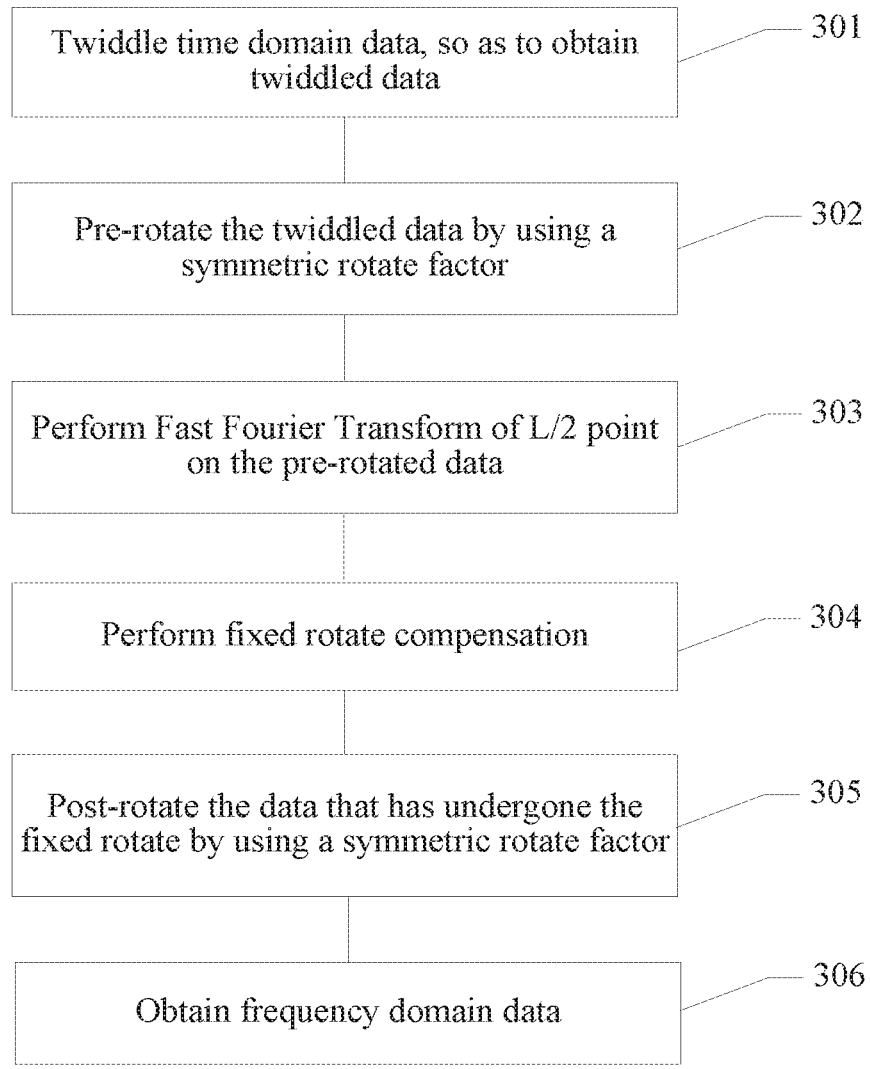
FIG. 3 is a schematic flow chart of another embodiment of a time-domain to frequency-domain DCT-IV transform method provided in the present invention.

Referring to FIG. 3, a signal processing method provided in an embodiment of the present invention is used to implement time-domain to frequency-domain DCT-IV transform during a coding procedure, so as to reduce the storage amount in the transform. The method includes the following steps:

S301: Twiddle time domain data, so as to obtain twiddled data.

It is assumed that $\tilde{x}(n)$ is data requiring DCT-IV transform, and the data may be data undergone pre-processing steps such as windowing. Twiddle the data $\tilde{x}(n)$, so as to obtain twiddled data z(p);

$$z(p) = \tilde{x}(2p) + j \cdot \tilde{x}(L - 1 - 2p), p = 0, 1, 2, \ldots, \frac{L}{2} - 1$$

S302: Pre-rotate the twiddled data by using a symmetric rotate factor, where the rotate factor is $a \cdot W_{4L}^{2p+1}$, p=0, 1, 2, ..., L/2−1, and a is a constant.

Pre-rotate the twiddled data z(p), where the rotate factor is $a \cdot W_{4L}^{2p+1}$, and p=0, 1, 2, ..., L/2−1.

$$W_{4L}^{2p+1} = \cos\frac{2\pi(2p+1)}{4L} - j\sin\frac{2\pi(2p+1)}{4L},$$

$$p = 0, 1, 2, \ldots, \frac{L}{2} - 1,$$

and a is a constant.

$W_{4L}^{2p+1}$ in the rotate factor may also be expressed in the following form:

$$W_{4L}^{2p+1} = \cos\frac{2\pi(2p+1)}{4L} - j\sin\frac{2\pi(2p+1)}{4L},$$

$$p = 0, 1, 2, \ldots, \frac{L}{2} - 1,$$

which satisfies conditions of $$\cos\frac{2\pi(2(\frac{L}{2} - 1 - q) + 1)}{4L} = \cos\frac{2\pi(L - (2q+1))}{4L},$$

$$= \sin\frac{2\pi(2q+1)}{4L}$$

$q = 0, 1, 2, \ldots, \frac{L}{4} - 1$ and $$\sin\frac{2\pi(2(\frac{L}{2} - 1 - q) + 1)}{4L} = \sin\frac{2\pi(L - (2q+1))}{4L},$$

$$= \cos\frac{2\pi(2q+1)}{4L}$$

$q = 0, 1, 2, \ldots, \frac{L}{4} - 1,$ and therefore, in the specific implementation, only one of a cosine data table $$a \cdot \cos\frac{2\pi(2p+1)}{4L}, p = 0, 1, 2, \ldots, \frac{L}{2} - 1$$

or a sine data table $$a \cdot \sin\frac{2\pi(2p+1)}{4L}, p = 0, 1, 2 \ldots, L/2 - 1$$

of L/2 point needs to be stored.

S303: Perform Fast Fourier Transform (Fast Fourier Transform, FFT) of L/2 point on the pre-rotated data.

S304: Perform fixed rotate compensation.

The data that has undergone the FFT transform is multiplied with $W_{8L}^{-3}$ to perform the fixed rotate compensation, or the data that has undergone the FFT transform is multiplied with an approximate value of $W_{8L}^{-3}$ to perform the fixed rotate compensation, and the approximate value may be obtained by using the Taylor series expansion of $W_{8L}^{-3}$, for example, a result of first order Taylor series expansion $$1 + j\left(\frac{3\pi}{4L}\right)$$

is used as the approximate value of $W_{8L}^{-3}$.

S305: Post-rotate the data that has undergone the fixed rotate compensation by using a symmetric rotate factor, where the rotate factor is $b \cdot W_{4L}^{2q+1}$, q=0, 1, 2, . . . , L/2−1.

$$W_{4L}^{2q+1} = \cos\frac{2\pi(2q+1)}{4L} - j\sin\frac{2\pi(2q+1)}{4L}, q = 0, 1, 2, \ldots, \frac{L}{2} - 1,$$

and b is a constant.

$W_{4L}^{2q+1}$ in the rotate factor may also be expressed in the following form:

$$W_{4L}^{2q+1} = \cos\frac{2\pi(2q+1)}{4L} - j\sin\frac{2\pi(2q+1)}{4L}, q = 0, 1, 2, \ldots, \frac{L}{2} - 1,$$

and therefore, in the specific implementation, only one of a cosine data table $$b \cdot \cos\frac{2\pi(2q+1)}{4L}, q = 0, 1, 2, \ldots, \frac{L}{2} - 1$$

or a sine data table $$b \cdot \sin\frac{2\pi(2q+1)}{4L}, q = 0, 1, 2, \ldots, \frac{L}{2} - 1$$

of L/2 point needs to be stored.

To implement the perfect reconstruction, values of the constants a and b are selected as long as a product of the product of constants a and b of the two rotate factors in the forward transform and the product of constants c and d of the two rotate factors in the inverse transform is equal to 2/L. In an embodiment, the product of a and b is equal to $$\frac{\sqrt[2]{2}}{\sqrt[2]{L}}.$$

In another embodiment, $$a = b = \frac{\sqrt[4]{2}}{\sqrt[4]{L}}$$

is selected, in this way, after the pre-rotate and post-rotate, only one Cosine data table $$\frac{\sqrt[4]{2}}{\sqrt[4]{L}}\cos\frac{2\pi(2p+1)}{4L}, p = 0, 1, 2, \ldots, \frac{L}{2} - 1$$

of L/2 point needs to be stored.

S306: Obtain frequency domain data.

A real part of the post-rotated data is expressed as y(2q), which is the odd number frequency of the frequency domain data; and an opposite number of an imaginary part of the post-rotated data is expressed as y(L−1−2q), which is the even number frequency of the frequency domain data.

$$\begin{cases} y(2q) = \text{Re}\{\bar{Z}(q)\} \\ y(L-1-2q) = -\text{Im}\{\bar{Z}(q)\} \end{cases}, q = 0, 1, 2, \ldots, \frac{L}{2} - 1$$

where $$\bar{Z}(q) = W_{8L}^{-3} * W_{4L}^{2q+1} \sum_{p=0}^{L/2-1} \{W_{4L}^{2p+1}\} W_{L/2}^{pq},$$

$$p, q = 0, \ldots, \frac{L}{2} - 1$$

or $$\bar{Z}(q) = W_{4L}^{2q+1} \sum_{p=0}^{L/2-1} \{W_{8L}^{-3} * W_{4L}^{2p+1}\} W_{L/2}^{pq},$$

$$p, q = 0, \ldots, L/2 - 1$$

or $$\bar{Z}(q) = \left(1 + j\frac{3\pi}{4L}\right) * W_{4L}^{2q+1} \sum_{p=0}^{L/2-1} \{z(p) * W_{4L}^{2p+1}\} W_{L/2}^{pq \text{ FFT}},$$

$$p, q = 0, \ldots, L/2 - 1$$

or $$\bar{Z}(q) = W_{4L}^{2q+1} \sum_{p=0}^{L/2-1} \left\{\left(1 + j\frac{3\pi}{4L}\right) * z(p) * W_{4L}^{2p+1}\right\} W_{L/2}^{pq \text{ FFT}},$$

$$p, q = 0, \ldots, L/2 - 1,$$

which is the post-rotated data.

The step of performing the fixed rotate compensation in the embodiment may not only be performed before the post-rotate and may also be performed before the pre-rotate or before the FFT transform or after the post-rotate. In the transform formula, the fixed rotate compensation and operation of other part are of a multiplication relationship, so the communicative property of multiplication is also applicable.

In this embodiment, the step of perform the fixed rotate compensation is added, so that it is ensured that data obtained after the transform consists with the data obtained after the original DCT-IV transform, thereby improving the accuracy of the DCT-IV transform.

The inverse transform of the DCT-IV has steps similar to those in the forward transform, only except that in the inverse transform, frequency domain data is input and time domain data is output. Therefore, in the foregoing embodiment, an embodiment of the inverse transform of DCT-IV is then constructed when the input data and the output data are changed into the frequency domain data and the time domain data, respectively. In addition, the inverse transform and the forward transform of DCT-IV may have different orders of performing the fixed rotate compensation. For example, in the forward transform, the fixed rotate compensation is performed after the post-rotate, and in the inverse transform, the fixed rotate compensation is performed before the pre-rotate.

In audio/video coding, the MDCT transform is also widely applied because it adopts a time domain aliasing cancellation (TDAC) technique to alleviate the "boundary effect". A formula of the MDCT transform is:

$$X_k = A \sum_{n=0}^{N-1} y_n \cos\left[\frac{2\pi}{N}\left(n + \frac{1}{2} + \frac{N}{4}\right)\left(k + \frac{1}{2}\right)\right] \ k = 0, 1 \ldots , \frac{N}{2} - 1,$$

where A is a normalization factor, and A is a constant. It can be seen that, performing the MDCT forward transform and inverse transform directly according to the transform formula will result in high computational complexity and storage amount, especially for the MDCT transform of a larger point. The MDCT transform is widely applied in the field of real-time communications, especially in audio coding, so providing a rapid MDCT transform method also becomes an urgent need.

Figure 4:
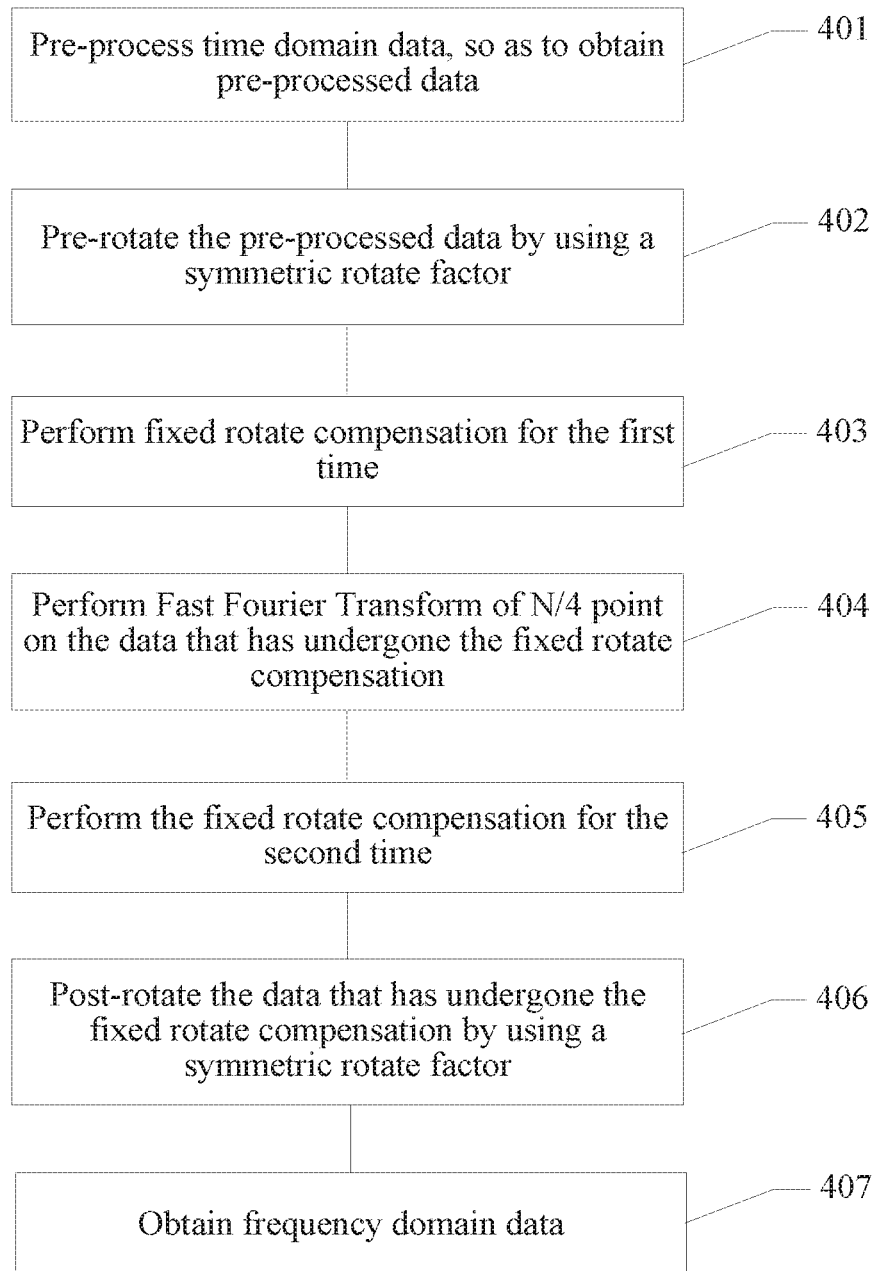
FIG. 4 is a schematic flow chart of an embodiment of a time-domain to frequency-domain MDCT transform method provided in the present invention.

Referring to FIG. 4, a signal processing method provided in an embodiment of the present invention is used to implement time-domain to frequency-domain MDCT transform during a coding procedure, so as to reduce the storage amount in the transform. The method includes the following steps:

S401: Pre-process time domain data, so as to obtain pre-processed data.

It is assumed that $y_n$ is data requiring MDCT transform, and the data may be data undergone processing steps such as windowing. Twiddle the data $y_n$, so as to obtain twiddled data $u_n$:

$$u_n = \left(z_{2n} + jz_{\frac{N}{2}-1-2n}\right) \ n = 0, 1, 2, \ldots , \frac{N}{4} - 1$$

where:

$$\begin{cases} z_{n+\frac{N}{4}} = y_n - y_{\frac{N}{2}-1-n} \\ z_{\frac{N}{4}-1-n} = -y_{N-1-n} - y_{\frac{N}{2}+n} \end{cases} \ n = 0, 1, 2, \ldots , \frac{N}{4} - 1$$

or be represented as:

$$\begin{cases} z_n = -y_{n+\frac{3N}{4}} - y_{\frac{3N}{4}-1-n} & n = 0, 1, 2, \ldots , \frac{N}{4} - 1 \\ z_n = y_{n-\frac{N}{4}} - y_{\frac{3N}{4}-1-n} & n = \frac{N}{4}, \frac{N}{4}+1, \ldots , \frac{N}{2} - 1 \end{cases}$$

S402: Pre-rotate the pre-processed data by using a symmetric rotate factor, where the rotate factor is $a \cdot W_N^{n+0.5}$, and $$n = 0, 1, 2, \ldots , \frac{N}{4} - 1.$$

Pre-rotate the twiddled data $u_n$, where the rotate factor is $a \cdot W_N^{n+0.5}$, and $$n = 0, 1, 2, \ldots , \frac{N}{4} - 1.$$

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right),$$

and a is a constant.

$W_N^{n+0.5}$ in the rotate factor may also be expressed in the following form:

$$W_N^{n+0.5} = \cos\left(\frac{2\pi(n+0.5)}{N}\right) - j\sin\left(\frac{2\pi(n+0.5)}{N}\right)$$

which satisfies conditions of $$\cos\left(\frac{2\pi}{N}(n+0.5)\right) = \sin\left(\frac{2\pi}{N}\left(\frac{N}{4} - 1 - n + 0.5\right)\right)$$

and $$\sin\left(\frac{2\pi}{N}(n+0.5)\right) = \cos\left(\frac{2\pi}{N}\left(\frac{N}{4} - 1 - n + 0.5\right)\right),$$

and therefore, in the specific implementation, only one of a cosine data table $$a \cdot \cos\left(\frac{2\pi}{N}(n+0.5)\right), n = 0, 1, 2, \ldots , \frac{N}{4} - 1$$

or a sine data table $$a \cdot \sin\left(\frac{2\pi}{N}(n+0.5)\right), n = 0, 1, 2, \ldots , \frac{N}{4} - 1$$

of N/4 point needs to be stored.

S403: Perform fixed rotate compensation for the first time.

Perform the fixed rotate compensation on the pre-rotated data, and a fixed rotate compensation factor is $W_N^{-0.375}$. In order to further reduce the computational complexity, some approximate values, such as Taylor series expansion, may be used to replace $W_N^{-0.375}$ to perform the fixed rotate compensation. For example, a result of first order Taylor series expansion $$1 + j\left(\frac{3\pi}{4N}\right)$$

is used as the approximate value of $W_N^{-0.375}$ to perform the fixed rotate compensation.

S404: Perform. FFT transform of N/4 point on the data that has undergone the fixed rotate compensation.

S405: Perform the fixed rotate compensation for the second time.

The data that has undergone the FFT transform is multiplied with $W_N^{-0.375}$ to perform the fixed rotate compensation, or the data that has undergone the FFT transform is multiplied with an approximate value of $W_N^{-0.375}$ to perform the fixed rotate compensation, and the approximate value may be obtained by using the Taylor series expansion of $W_N^{-0.375}$, for example, a result of first order Taylor series expansion $$1 + j\left(\frac{3\pi}{4N}\right)$$

is used as the approximate value of $W_N^{-0.375}$.

S406: Post-rotate the data that has undergone the fixed rotate compensation by using a symmetric rotate factor, where the rotate factor is $b \cdot W_N^{k+0.5}$, and $$k = 0, 1, 2, \ldots, \frac{N}{4} - 1.$$

$$W_N^{k+0.5} = e^{-j\frac{2\pi}{N}(k+0.5)} = \cos\left(\frac{2\pi(k+0.5)}{N}\right) - j\sin\left(\frac{2\pi(k+0.5)}{N}\right),$$

and b is a constant.

$W_N^{k+0.5}$ in the rotate factor may also be expressed in the following form:

$$W_N^{k+0.5} = \cos\left(\frac{2\pi(k+0.5)}{N}\right) - j\sin\left(\frac{2\pi(k+0.5)}{N}\right),$$

and therefore, in the specific implementation, only one of $$a \cdot \cos\left(\frac{2\pi}{N}(k+0.5)\right), k = 0, 1, 2, \ldots, \frac{N}{4} - 1$$

a cosine data table or a sine $$a \cdot \sin\left(\frac{2\pi}{N}(k+0.5)\right), k = 0, 1, 2, \ldots, \frac{N}{4} - 1$$

data table of N/4 point needs to be stored.

S407: Obtain frequency domain data.

A real part of the post-rotated data is expressed as $X2_k$, which is the odd number frequency of the frequency domain data; and an opposite number of an imaginary part of the post-rotated data is expressed as $X_{N/2-1-2k}$, which is the even number frequency of the frequency domain data.

The frequency domain data, that is, the final spectrum, is $X_k, k = 0, 1, 2 \ldots, \frac{N}{2} - 1$, which may be expressed as:

-continued $$X_{2k} = \text{Re}\left\{W_N^{-0.375} \cdot b \cdot W_N^{k+0.5} \sum_{n=0}^{\frac{N}{4}-1} u_n \cdot W_N^{-0.375} \cdot a \cdot W_N^{n+0.5} W_{\frac{N}{4}}^{nk}\right\} k = 0,$$

$$1, 2, \ldots, \frac{N}{4} - 1,$$

$$X_{\frac{N}{2}-1-2k} = \text{Im}\left\{W_N^{-0.375} \cdot b \cdot W_N^{k+0.5} \sum_{n=0}^{\frac{N}{4}-1} u_n \cdot W_N^{-0.375} \cdot a \cdot W_N^{n+0.5} W_{\frac{N}{4}}^{nk}\right\} k = 0,$$

$$1, 2, \ldots, \frac{N}{4} - 1,$$

$$X_{2k} = \text{Re}\left\{\left(1 + j\left(\frac{3\pi}{4N}\right)\right) \cdot b \cdot W_N^{k+0.5} \sum_{n=0}^{\frac{N}{4}-1} u_n \cdot \left(1 + j\left(\frac{3\pi}{4N}\right)\right) \cdot a \cdot W_N^{n+0.5} W_{\frac{N}{4}}^{nk}\right\} k = 0,$$

$$1, 2, \ldots, \frac{N}{4} - 1,$$

$$X_{\frac{N}{2}-1-2k} = -\text{Im}\left\{\left(1 + j\left(\frac{3\pi}{4N}\right)\right) \cdot b \cdot W_N^{k+0.5} \sum_{n=0}^{\frac{N}{4}-1} u_n \cdot \left(1 + j\left(\frac{3\pi}{4N}\right)\right) \cdot a \cdot W_N^{n+0.5} W_{\frac{N}{4}}^{nk}\right\} k = 0,$$

$$1, 2, \ldots, \frac{N}{4} - 1,$$

or

It should be noted that, the step of performing the fixed rotate compensation for the first time by using $W_N^{-0.375}$ may not only be performed after the pre-rotate, and may also be performed before the pre-rotate, and the step of performing the fixed rotate compensation for the second time by using $W_N^{-0.375}$ may not only be performed before the post-rotate, and may also be performed after the post-rotate.

In the transform formula, the fixed rotate compensation and operation of other part are of a multiplication relationship, so the communicative property of multiplication is applicable, the fixed rotate compensation may be performed once or more, and the execution order of the fixed rotate compensation may be any order before the obtaining of the frequency domain data. The product of the compensation factors is $W_N^{-0.75}$ or an approximate value of at least one factor of which the product is $W_N^{-0.75}$.

In this embodiment, adopting the rotate factors having symmetry may reduce the storage amount, the storage amount of the method before improvement is N/2 point, and the storage amount of the method after improvement is N/4 point. The step of performing fixed rotate compensation is added, thereby improving the accuracy of the MDCT transform, so that it is ensured that data obtained after the transform consists with the data obtained after the original MDCT transform.

An original formula of MDCT fast transform based on FFT of N/4 point is:

$$X_{2k} - jX_{\frac{N}{2}-1-2k} = A \cdot \overbrace{W_N^{k+0.125}}^{\text{post-rotation}} \sum_{n=0}^{\frac{N}{4}-1} \left\{u_n \overbrace{W_N^{n+0.125}}^{\text{pre-rotation}}\right\} \overbrace{W_{\frac{N}{4}}^{nk}}^{\frac{N}{4} \text{ points DFT}} \quad k = 0,$$

$$\ldots, \frac{N}{4} - 1$$

-continued this may be rewritten as:

$$X_{2k} - jX_{\frac{N}{2}-1-2k} =$$

$$A \cdot W_N^{-0.375} \cdot \overset{post-rotation}{W_N^{k+0.5}} \sum_{n=0}^{\frac{N}{4}-1} \left\{ W_N^{-0.375} \cdot u_n \cdot \overset{pre-rotation}{W_N^{n+0.5}} \right\} \overset{\frac{N}{4} points DFT}{W_{\frac{N}{4}}^{nk}} \quad k = 0,$$

$$\ldots, \frac{N}{4} - 1$$

where, $$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right),$$

$$n = 0, 1, 2 \ldots, \frac{N}{4} - 1$$

$$W_N^{k+0.5} = e^{-j\frac{2\pi}{N}(k+0.5)} = \cos\left(\frac{2\pi(k+0.5)}{N}\right) - j\sin\left(\frac{2\pi(k+0.5)}{N}\right),$$

$$k = 0, 1, 2 \ldots, \frac{N}{4} - 1$$

It is easy to prove that the modified rotate factor has the feature of symmetry, that is, $W_N^{n+0.5}$ satisfies:

$$\cos\left(\frac{2\pi}{N}(n+0.5)\right) = \sin\left(\frac{2\pi}{N}\left(\frac{N}{4} - 1 - n + 0.5\right)\right);$$

$$\sin\left(\frac{2\pi}{N}(n+0.5)\right) = \cos\left(\frac{2\pi}{N}\left(\frac{N}{4} - 1 - n + 0.5\right)\right).$$

Likewise, $W_N^{k+0.5}$ also satisfies such symmetry.

The feature of symmetry may be used to reduce the storage amount. During implementation, only a cosine table of N/4 point or a sine table of N/4 point needs to be stored for $W_N^{n+0.5}$, the fixed rotate compensation of $W_N^{-0.375}$ is performed before performing the FFT transform of N/4 point, and the fixed rotate compensation of $W_N^{-0.375}$ is performed after performing the FFT transform of N/4 point. It can be proved that the transform is completely reconstructed.

In order to further reduce the computational complexity, some approximate values, such as Taylor series expansion, may be used to replace $W_N^{-0.375}$ to perform the fixed rotate compensation. For example, a result of first order Taylor series expansion $$1 + j\left(\frac{3\pi}{4N}\right)$$

may be used as the approximate value of $W_N^{-0.375}$.

Figure 5:
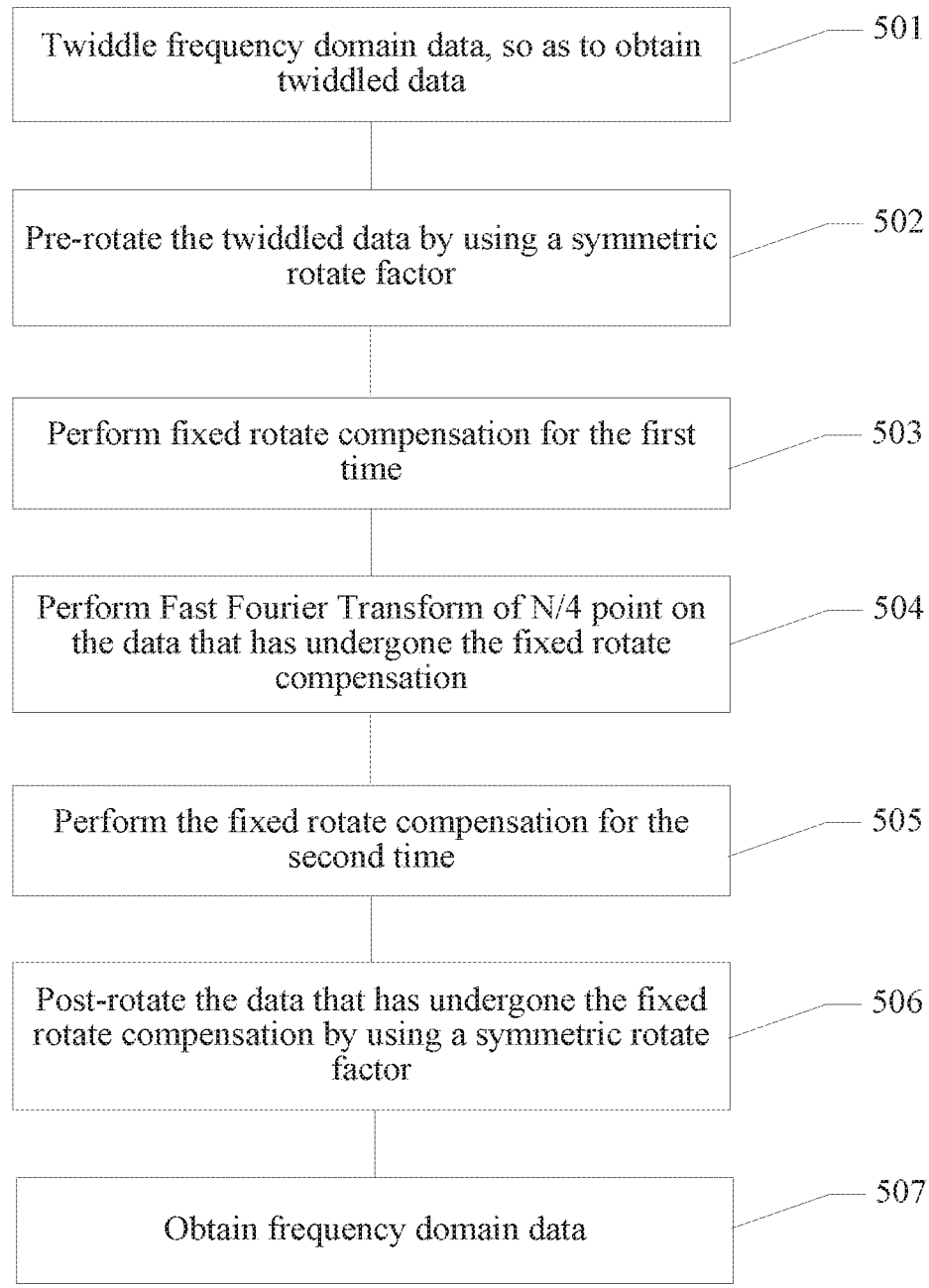
FIG. 5 is a schematic flow chart of an embodiment of a frequency-domain to time-domain MDCT transform method provided in the present invention.

Referring to FIG. 5, a signal processing method provided in an embodiment of the present invention is used to implement frequency-domain to time-domain MDCT transform during a coding procedure, so as to reduce the storage amount in the transform. The method includes the following steps:

S501: Twiddle frequency domain data, so as to obtain twiddled data.

An intermediate variable obtained after data twiddle is $$X_{2k} + jX_{\frac{N}{2}-1-2k}, \text{ where } k = 0, 1, 2, \ldots, \frac{N}{4} - 1.$$

S502: Pre-rotate the twiddled data by using a symmetric rotate factor.

Pre-rotate the twiddled data $$X_{2k} + jX_{\frac{N}{2}-1-2k},$$

where the rotate factor is $c \cdot W_N^{k+0.5}$, and $$k = 0, 1, 2, \ldots, \frac{N}{4} - 1.$$

$$W_N^{k+0.5} = e^{-j\frac{2\pi}{N}(k+0.5)} = \cos\left(\frac{2\pi(k+0.5)}{N}\right) - j\sin\left(\frac{2\pi(k+0.5)}{N}\right),$$

and c is a constant.

S503: Perform fixed rotate compensation for the first time.

Perform fixed rotate compensation on the pre-rotated data, where a fixed rotate compensation factor is $W_N^{-0.375}$. In order to further reduce the computational complexity, some approximate values, such as Taylor series expansion, may be used to replace $W_N^{-0.375}$ to perform the fixed rotate compensation. For example, a result of first order Taylor series expansion $$1 + j\left(\frac{3\pi}{4N}\right)$$

is used as the approximate value of $W_N^{-0.375}$ to perform the fixed rotate compensation.

S504: Perform. FFT transform of N/4 point on the data that has undergone the fixed rotate compensation.

S505: Perform the fixed rotate compensation for the second time.

The data that has undergone the FFT transform is multiplied with $W_N^{-0.375}$ to perform the fixed rotate compensation, or the data that has undergone the FFT transform is multiplied with an approximate value of $W_N^{-0.375}$ to perform the fixed rotate compensation, and the approximate value may be obtained by using the Taylor series expansion of $W_N^{-0.375}$ for example, a result of first order Taylor series expansion $$1 + j\left(\frac{3\pi}{4N}\right)$$

is used as the approximate value of $W_N^{-0.375}$.

S506: Post-rotate the data that has undergone the fixed rotate compensation by using a symmetric rotate factor.

Post-rotate the data after the fixed rotate, where the rotate factor is $d \cdot W_N^{n+0.5}$, and $$n = 0, 1, 2, \ldots, \frac{N}{4} - 1.$$

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right),$$

and d is a constant.

S507: Obtain time domain data.

Obtain time domain data $\hat{x}_n$, n=0, 1, 2, ..., N−1.

$$\begin{cases} \hat{x}_{2n+\frac{N}{2}} = \text{Re}\{u_n\} \\ \hat{x}_{N-1-2n} = -\text{Re}\{u_n\} \end{cases} n = 0, 1, 2, \ldots, \frac{N}{4} - 1$$

$$\begin{cases} \hat{x}_{\frac{N}{4}-1-2n} = \hat{x}_{\frac{N}{4}+2n} = \text{Im}\{u_n\} & n = 0, 1, 2, \ldots, \frac{N}{8} - 1 \\ \hat{x}_{2n-\frac{N}{4}} = \hat{x}_{3\frac{N}{4}-1-2n} = \text{Im}\{u_n\} & n = \frac{N}{8}, \frac{N}{8}+1, \ldots, \frac{N}{4} - 1 \end{cases}$$

where $\begin{cases} u_n = y_{n+\frac{N}{8}} \\ u_{n+\frac{N}{8}} = y_n \end{cases} n = 0, 1, 2, \ldots, \frac{N}{8} - 1$ It should be noted that, to implement the perfect reconstruction, values of the constants a, b, c and d are selected as long as a product of the product of a and b in the forward transform and the product of c and d in the inverse transform is equal to 4/N. In this embodiment, $$a = b = c = d = \frac{\sqrt{2}}{\sqrt[4]{N}}$$

is selected, and therefore, only one Cosine data table $$\frac{\sqrt{2}}{\sqrt[4]{N}}\cos\left(\frac{2\pi}{N}(k+0.5)\right), k = 0, 1, 2, \ldots, \frac{N}{4} - 1$$

of N/4 point needs to be stored.

Likewise, the step of performing the fixed rotate compensation for the first time by using $W_N^{-0.375}$ may not only be performed after the pre-rotate, and may also be performed before the pre-rotate, and the step of performing the fixed rotate compensation for the second time by using $W_N^{-0.375}$ may not only be performed before the post-rotate, and may also be performed after the post-rotate. Due to the communicative property of multiplication, the fixed rotate compensation may also be performed for three or more times, and a product of compensation factors is $W_N^{-0.75}$ or an approximate value of at least one factor of which the product is $W_N^{-0.75}$.

In this embodiment, the steps of fixed rotate compensation performed twice are adopted, thereby improving the accuracy of the MDCT transform, so that it is ensured that data obtained after the transform consists with the data obtained after the original MDCT transform.

Figure 6:
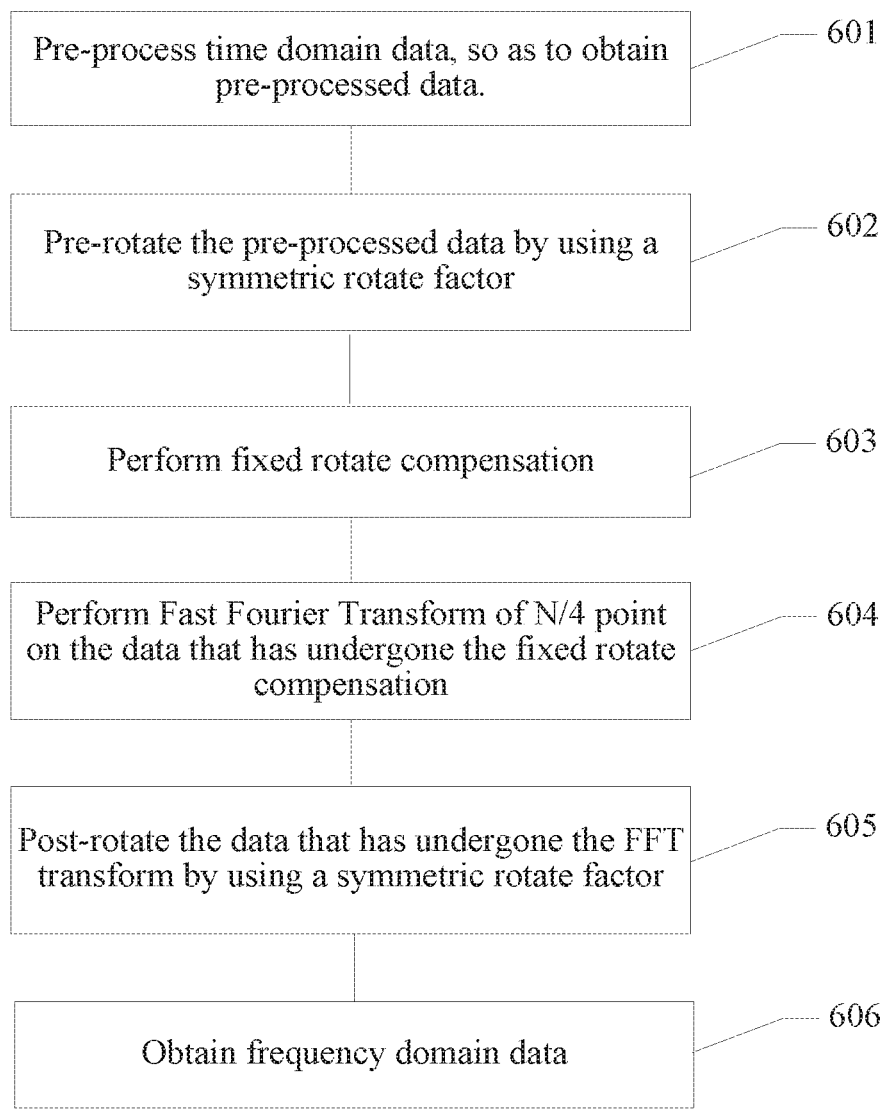
FIG. 6 is a schematic flow chart of another embodiment of a time-domain to frequency-domain MDCT transform method provided in the present invention.

Referring to FIG. 6, a signal processing method provided in an embodiment of the present invention is used to implement time-domain to frequency-domain MDCT transform during a coding procedure, so as to reduce the storage amount in the transform. The method includes the following steps:

S601: Pre-process time domain data, so as to obtain pre-processed data.

It is assumed that $y_n$ is data requiring MDCT transform, and the data may be data undergone processing steps such as windowing. Twiddle the data $y_n$, so as to obtain twiddled data $u_n$:

$$u_n = (z_{2n} + jz_{N/2-1-2n})$$

$$n = 0, 1, 2, \ldots, N/4 - 1$$

where:

$$\begin{cases} z_{n+N/4} = y_n - y_{N/2-1-n} \\ z_{N/4-1-n} = -y_{N-1-n} - y_{N/2+n} \end{cases}$$

$$n = 0, 1, 2, \ldots, N/4 - 1$$

or be represented as:

$$\begin{cases} z_n = -y_{n+\frac{3N}{4}} - y_{\frac{3N}{4}-1-n} & n = 0, 1, 2, \ldots, \frac{N}{4} - 1 \\ z_n = -y_{n-\frac{N}{4}} - y_{\frac{3N}{4}-1-n} & n = \frac{N}{4}, \frac{N}{4}+1, \ldots, \frac{N}{2} - 1 \end{cases}$$

S602: Pre-rotate the pre-processed data by using a symmetric rotate factor, where the rotate factor and is $a \cdot W_N^{n+0.5}$, and n=0, 1, 2, ..., N/4−1.

Pre-rotate the twiddled data $u_n$, where the rotate factor is $a \cdot W_N^{n+0.5}$, and $$n = 0, 1, 2, \ldots, N/4 - 1.$$

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right),$$

and a is a constant.

$W_N^{n+0.5}$ in the rotate factor may also be expressed in the following form:

$$W_N^{n+0.5} = \cos\left(\frac{2\pi(n+0.5)}{N}\right) - j\sin\left(\frac{2\pi(n+0.5)}{N}\right),$$

which satisfies conditions of $$\cos\left(\frac{2\pi}{N}(n+0.5)\right) = \sin\left(\frac{2\pi}{N}(N/4 - 1 - n + 0.5)\right) \text{ and}$$

$$\sin\left(\frac{2\pi}{N}(n+0.5)\right) = \cos\left(\frac{2\pi}{N}(N/4 - 1 - n + 0.5)\right),$$

and therefore, in the specific implementation, only one of a cosine data table $$a \cdot \cos\left(\frac{2\pi}{N}(n+0.5)\right), n = 0, 1, 2, \ldots, N/4 - 1$$

or a sine data table $$a \cdot \sin\left(\frac{2\pi}{N}(n+0.5)\right), n = 0, 1, 2, \ldots, N/4-1$$

of N/4 point needs to be stored.

S603: Perform fixed rotate compensation.

Perform the fixed rotate compensation on the pre-rotated data, where a fixed rotate compensation factor is $W_N^{-0.75}$. In order to further reduce the computational complexity, some approximate values, such as Taylor series expansion, may be used to replace $W_N^{-0.75}$ to perform the fixed rotate compensation. For example, a result of first order Taylor series expansion $$1 + j\left(\frac{3\pi}{2N}\right)$$

is used as the approximate value of $W_N^{-0.75}$ to perform the fixed rotate compensation.

S604: Perform. FFT transform of N/4 point on the data that has undergone the fixed rotate compensation.

S605: Post-rotate the data that has undergone the FFT transform by using a symmetric rotate factor.

Post-rotate the data that has undergone the FFT transform, where a rotate factor is $b \cdot W_N^{k+0.5}$, and $$k = 0, 1, 2, \ldots, N/4 - 1.$$

$$W_N^{k+0.5} = e^{-j\frac{2\pi}{N}(k+0.5)} = \cos\left(\frac{2\pi(k+0.5)}{N}\right) - j\sin\left(\frac{2\pi(k+0.5)}{N}\right),$$

and b is a constant.

$W_N^{k+0.5}$ in the rotate factor may also be expressed in the following form:

$$W_N^{k+0.5} = \cos\left(\frac{2\pi(k+0.5)}{N}\right) - j\sin\left(\frac{2\pi(k+0.5)}{N}\right),$$

and therefore, in the specific implementation, only one of a cosine data table $$a \cdot \cos\left(\frac{2\pi}{N}(k+0.5)\right), k = 0, 1, 2, \ldots, N/4-1$$

or a sine data table $$a \cdot \sin\left(\frac{2\pi}{N}(k+0.5)\right), k = 0, 1, 2, \ldots, N/4-1$$

of N/4 point needs to be stored.

S606: Obtain frequency domain data.

A real part of the post-rotated data is expressed as $X2_k$, which is the odd number frequency of the frequency domain data; and an opposite number of an imaginary part of the post-rotated data is expressed as $$X_{N/2-1-2k},$$

which is the even number frequency of the frequency domain data.

The frequency domain data, that is, the final spectrum, is $X_k$, k=0, 1, 2 . . . , N/2−1, which may be expressed as:

$$X_{2k} = \mathrm{Re}\left\{b \cdot W_N^{k+0.5} \sum_{n=0}^{N/4-1} u_n \cdot W_N^{-0.75} \cdot a \cdot W_N^{n+0.5} W_{N/4}^{nk}\right\}$$

$$k = 0, \ldots, N/4 - 1$$

$$X_{N/2-1-2k} = -\mathrm{Im}\left\{b \cdot W_N^{k+0.5} \sum_{n=0}^{N/4-1} u_n \cdot W_N^{-0.75} \cdot a \cdot W_N^{n+0.5} W_{N/4}^{nk}\right\}$$

$$k = 0, \ldots, N/4 - 1,$$

or $$X_{2k} = \mathrm{Re}\left\{b \cdot W_N^{k+0.5} \sum_{n=0}^{N/4-1} u_n \cdot \left(1 + j\left(\frac{3\pi}{2N}\right)\right) \cdot a \cdot W_N^{n+0.5} W_{N/4}^{nk}\right\}$$

$$k = 0, \ldots, N/4 - 1$$

$$X_{N/2-1-2k} = -\mathrm{Im}\left\{b \cdot W_N^{k+0.5} \sum_{n=0}^{N/4-1} u_n \cdot \left(1 + j\left(\frac{3\pi}{2N}\right)\right) \cdot a \cdot W_N^{n+0.5} W_{N/4}^{nk}\right\}$$

$$k = 0, \ldots, N/4 - 1$$

It should be noted that, the step of performing the fixed rotate compensation in the embodiment may be performed after the pre-rotate or performed before the pre-rotate, and may also be performed before the post-rotate or after the pre-rotate. In the transform formula, the fixed rotate compensation and operation of other part are of a multiplication relationship, so the communicative property of multiplication is also applicable.

Figure 7:
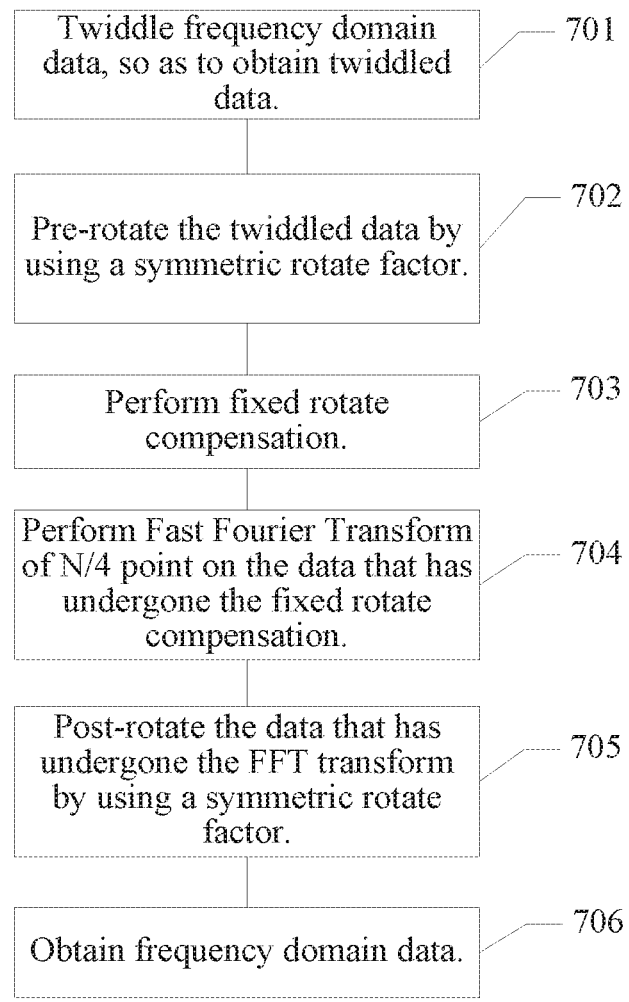
FIG. 7 is a schematic flow chart of another embodiment of a frequency-domain to time-domain MDCT transform method provided in the present invention.

Referring to FIG. 7, a signal processing method provided in an embodiment of the present invention is used to implement frequency-domain to time-domain MDCT transform during a coding procedure, so as to reduce the storage amount in the transform. The method includes the following steps:

S701: Twiddle frequency domain data, so as to obtain twiddled data.

An intermediate variable obtained after data twiddle is $$X_{2k} + jX_{\frac{N}{2}-1-2k}, \text{ where } k = 0, 1, 2, \ldots, \frac{N}{4} - 1.$$

S702: Pre-rotate the twiddled data by using a symmetric rotate factor.

Pre-rotate the twiddled data $$\left(X_{2k} + jX_{\frac{N}{2}-1-2k}\right),$$

where the rotate factor is $c \cdot W_N^{k+0.5}$ and $$k = 0, 1, 2, \ldots, \frac{N}{4} - 1.$$

$$W_N^{k+0.5} = e^{-j\frac{2\pi}{N}(k+0.5)} = \cos\left(\frac{2\pi(k+0.5)}{N}\right) - j\sin\left(\frac{2\pi(k+0.5)}{N}\right),$$

and c is a constant.

S703: Perform fixed rotate compensation.

Perform the fixed rotate compensation on the pre-rotated data, where a fixed rotate compensation factor is $W_N^{-0.75}$. In order to further reduce the computational complexity, some approximate values, such as Taylor series expansion, may be used to replace $W_N^{-0.75}$ to perform the fixed rotate compensation. For example, a result of first order Taylor series expansion $$1 + j\left(\frac{3\pi}{2N}\right)$$

is used as the approximate value of $W_N^{-0.75}$ to perform the fixed rotate compensation.

S704: Perform FFT transform of N/4 point on the data that has undergone the fixed rotate compensation.

S705: Post-rotate the data that has undergone the FFT transform by using a symmetric rotate factor.

Post-rotate the data that has undergone the FFT transform, where the rotate factor is $d \cdot W_N^{n+0.5}$, and $$n = 0, 1, 2, \ldots, \frac{N}{4} - 1.$$

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right),$$

and d is a constant.

S706: Obtain time domain data.

Obtain time domain data $\hat{x}_n$, n=0, 1, 2, . . . , N−1.

$$\begin{cases} \hat{x}_{2n+\frac{N}{2}} = \text{Re}\{u_n\} \\ \hat{x}_{N-1-2n} = -\text{Re}\{u_n\} \end{cases} n = 0, 1, 2, \ldots, \frac{N}{4} - 1$$

$$\begin{cases} \hat{x}_{\frac{N}{4}-1-2n} = \hat{x}_{\frac{N}{4}+2n} = \text{Im}\{u_n\} & n = 0, 1, 2, \ldots \frac{N}{8} - 1 \\ \hat{x}_{2N-\frac{N}{4}} = \hat{x}_{3\frac{N}{4}-1-2n} = \text{Im}\{u_n\} & n = \frac{N}{8}, \frac{N}{8}+1, \ldots, \frac{N}{4} - 1 \end{cases}$$

where $$\begin{cases} u_n = y_{n+\frac{N}{8}} \\ u_{n+\frac{N}{8}} = y_n \end{cases} n = 0, 1, 2, \ldots, \frac{N}{8} - 1$$

It should be noted that, to implement the perfect reconstruction, values of the constants a, b, c and d are selected as long as a product of the product of a and b in the forward transform and the product of c and d in the inverse transform is equal to 4/N. In this embodiment, $$a = b = c = d = \frac{\sqrt{2}}{\sqrt[4]{N}}$$

is selected, and therefore, only one Cosine data table $$\frac{\sqrt{2}}{\sqrt[4]{N}}\cos\left(\frac{2\pi}{N}(k+0.5)\right), k = 0, 1, 2, \ldots, \frac{N}{4} - 1$$

of N/4 point needs to be stored.

Likewise, the step of performing the fixed rotate compensation in the embodiment may be performed after the pre-rotate or performed before the pre-rotate, and may also be performed before the post-rotate or after the pre-rotate. In the transform formula, the fixed rotate compensation and operation of other part are of a multiplication relationship, so the communicative property of multiplication is also applicable.

Those of ordinary skill in the art should understand that all or a part of the process of the method according to the embodiments of the present invention may be implemented by a computer program instructing relevant hardware. The program may be stored in a computer readable storage medium. When the program is run, the processes of the methods according to the embodiments of the present invention are performed. The storage medium may be a magnetic disk, an optical disk, a Read-Only Memory (Read-Only Memory, ROM), or a Random. Access Memory (Random Access Memory, RAM).

Figure 8:
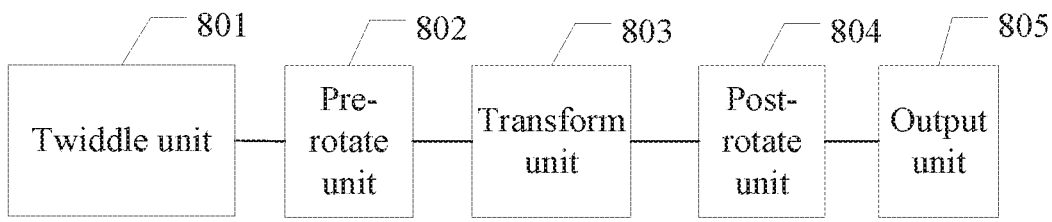
FIG. 8 is a schematic structural diagram of an embodiment of a signal processing device provided in the present invention.

Referring to FIG. 8 that correlates to the foregoing method embodiment, an embodiment of a signal processing device of the present invention includes:

a twiddle unit 801, configured to twiddle input data, so as to obtain twiddled data;

a pre-rotate unit 802, configured to pre-rotate the twiddled data by using a symmetric rotate factor, where the rotate factor is $a \cdot W_{4L}^{2p+1}$, p=0, . . . , L/2−1, and a is a constant;

a transform unit 803, configured to perform a Fast Fourier (Fast Fourier Transform, FFT) transform of L/2 point on the pre-rotated data, where L is the length of the input data;

a post-rotate unit 804, configured to post-rotate the data that has undergone the FFT transform by using a symmetric rotate factor, where the rotate factor is $b \cdot W_{4L}^{2p+1}$, q=0, . . . , L/2−1, and b is a constant; and an output unit 805, configured to obtain output data.

The signal processing device may be used to implement time-domain to frequency-domain or frequency-domain to time-domain DCT-IV transform in the coding/decoding procedure, in the forward transform, input data is time domain data, the output data is frequency domain data; and in the inverse transform, the input data is frequency domain data, the output data is the time domain data.

In another embodiment, the signal processing device further includes:

a fixed rotate compensation unit, configured to perform fixed rotate compensation by using a fixed rotate compensation factor.

In an embodiment, the fixed rotate compensation unit is configured to perform fixed rotate compensation at least one time, and a product of a rotate compensation factor of the at least one time fixed rotate compensation is $W_{8L}^{-3}$.

In another embodiment, the fixed rotate compensation unit is configured to perform fixed rotate compensation at least one time, and a rotate compensation factor of the at least one time fixed rotate compensation is a first order Taylor series expansion of at least one factor a product of which is $W_{8L}^{-3}$.

In order to satisfy reconstruction, the product of a and b may be equal to $$\frac{\sqrt[2]{2}}{\sqrt[2]{L}},$$

and in an embodiment, for example, $$a = b = \frac{\sqrt[4]{2}}{\sqrt[4]{L}}.$$

Figure 9:
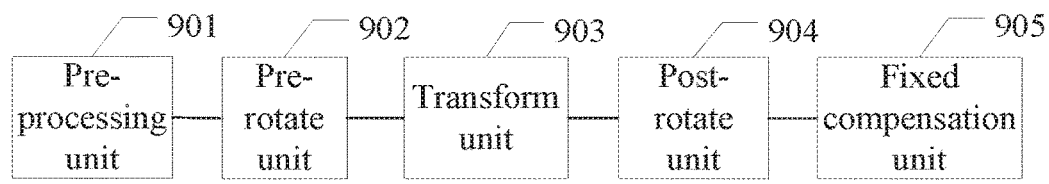
FIG. 9 is a schematic structural diagram of an embodiment of a time-domain to frequency-domain signal processing device provided in the present invention.

An embodiment of a time-domain to frequency-domain signal processing device provided in the present invention is used to implement the time-domain to frequency-domain MDCT transform in the coding procedure, so as to reduce the storage amount in the transform. Referring to FIG. 9, the signal processing device includes:

a pre-processing unit 901, configured to pre-process time domain data, so as to obtain pre-processed data;

a pre-rotate unit 902, configured to pre-rotate the pre-processed data by using a rotate factor $a \cdot W_N^{n+0.5}$;

a transform unit 903, configured to perform Fast Fourier Transform of N/4 point on the pre-rotated data;

a post-rotate unit 904, configured to post-rotate the data that has undergone the Discrete Fourier Transform by using a rotate factor $b \cdot W_N^{k+0.5}$, so as to obtain frequency domain data; where, the device further includes:

a fixed compensation unit 905, configured to perform fixed rotate compensation by using a fixed rotate compensation factor; where the a and b are constants, the N is the length of the time domain data, and $$W_N = e^{-j\frac{2\pi}{N}}.$$

In an embodiment, the fixed rotate compensation unit is configured to perform fixed rotate compensation at least one time, and a product of a rotate compensation factor of the at least one time fixed rotate compensation is $W_N^{-0.75}$.

In another embodiment, the fixed rotate compensation unit is configured to perform fixed rotate compensation at least one time, and a rotate compensation factor of the at least one time fixed rotate compensation is a first order Taylor series expansion of at least one factor a product of which is $W_N^{-0.75}$.

Figure 10:
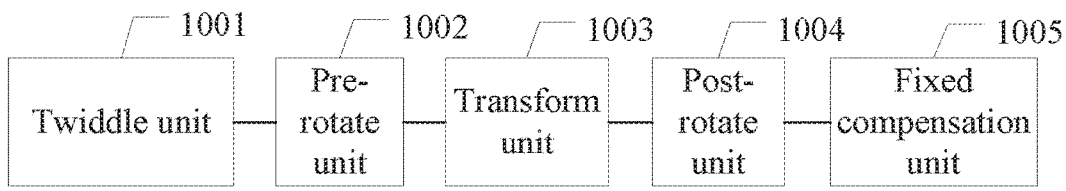
FIG. 10 is a schematic structural diagram of an embodiment of a frequency-domain to time-domain processing device provided in the present invention.

An embodiment of a frequency-domain to time-domain signal processing device provided in the present invention is used to implement the frequency-domain to time-domain MDCT transform in the coding procedure, so as to reduce the storage amount in the transform. Referring to FIG. 10, the signal processing device includes:

a twiddle unit 1001, configured to twiddle frequency domain data, so as to obtain twiddled data;

a pre-rotate unit 1002, configured to pre-rotate the twiddled data by using a rotate factor $c \cdot W_N^{k+0.5}$;

a transform unit 1003, configured to perform Fast Fourier Transform of N/4 point on the pre-rotated data;

a post-rotate unit 1004, configured to post-rotate the data that has undergone the Fast Fourier Transform by using a rotate factor $d \cdot W_N^{n+0.5}$; where, the device further includes:

a fixed compensation unit 1005, configured to perform fixed rotate compensation by using a fixed rotate compensation factor; where the c and d are constants, the N is twice the length of the frequency domain data, and $$W_N = e^{-j\frac{2\pi}{N}}.$$

In an embodiment, the fixed rotate compensation unit is configured to perform fixed rotate compensation at least one time, and a product of a rotate compensation factor of the at least one time fixed rotate compensation is $W_N^{-0.75}$.

In another embodiment, the fixed rotate compensation unit is configured to perform fixed rotate compensation at least one time, and a rotate compensation factor of the at least one time fixed rotate compensation unit is a first order Taylor series expansion of at least one factor a product of which is $W_N^{-0.75}$.

Exemplary logical blocks, modules and circuits in the description correlated to the embodiments disclosed in the specification may be constructed or implemented by using the following devices: a universal processor, a digital signal processor (DSP), an application specific integrated circuit (ASIC), a field programmable gate array (FPGA) or other programmable logical devices, discrete gate or transistor logic, discrete hardware components, or any combination designed for implementing the functions in the preceding part of the text. The universal processor may be a microprocessor, but alternatively, the processor may also be any regular processor, controller, micro-controller, or state machine. The processor may be constructed as a combination of computing devices, for example, a combination of a DSP and a microprocessor, a combination of multiple microprocessors, a combination of one or more microprocessors and a DSP core, or any one of other such configuration.

Described are only several embodiments of the present invention, and persons skilled in the art can make various modifications or variations of the present invention according to the disclosure of the application without departing from the spirit and scope of the present invention.

What is claimed is:

1. A method for processing an audio signal, comprising:
converting sound into an analog audio input signal;
converting the analog audio input signal into a digital audio signal;
obtaining a windowed time domain signal by windowing the digital audio signal;
obtaining a twiddled signal based on the windowed time domain signal;
pre-rotating the twiddled signal by using a first symmetric rotation factor to obtain a pre-rotated signal, wherein the first symmetric rotation factor is $a \cdot W_{4L}^{2p+1}$, p=0, K, L/2−1, wherein a is a constant and is a real number, wherein L is the length of the input audio signal;
performing a Fast Fourier transform (FFT) of L/2 points on the pre-rotated signal to obtain an FFT signal;
performing an in-place fixed rotate compensation on the FFT signal;
post-rotating the signal that has undergone the in-place fixed rotate compensation by using a second symmetric rotation factor to obtain a post-rotated signal, wherein the second symmetric rotation factor is $b \cdot W_{4L}^{2q+1}$, q=0, K, L/2−1, and b is a constant and is a real number;

quantizing a processed signal derived from the post-rotated signal to obtain a quantized signal; and writing the quantized signal into a bitstream for transmitting or storing.

2. The method according to claim 1, wherein the in-place fixed rotate compensation is performed by multiplying a fixed rotate compensation factor with the FFT signal.

3. The method according to claim 2, wherein the fixed rotate compensation factor is $$1 + j\left(\frac{3\pi}{4L}\right).$$

4. The method according to claim 1, wherein the twiddled signal is obtained according to z(p)=ℓ 2p)+j·ℓ L−1−2p), wherein z(p) denotes the twiddled signal, ℓ n) denotes the windowed time domain signal.

5. The method according to claim 1, wherein $W_{4L}^{2q+1}$ in the first symmetric rotation factor is expressed in the following form:

$$W_{4L}^{2p+1} = \cos\frac{2\pi(2p+1)}{4L} - j\sin\frac{2\pi(2p+1)}{4L}.$$

6. The method according to claim 1, wherein $W_{4L}^{2q+1}$ in the second symmetric rotation factor is expressed in the following form:

$$W_{4L}^{2p+1} = \cos\frac{2\pi(2p+1)}{4L} - j\sin\frac{2\pi(2p+1)}{4L}.$$

7. A mobile phone, comprising:
a microphone, configured to convert sound into an analog audio input signal;
an analog-to-digital converter, configured to convert the analog audio input signal into a digital audio signal;
an audio codec, configured to:
obtain a windowed time domain signal by windowing the digital audio signal,
obtain a twiddled signal based on the windowed time domain signal;
pre-rotate the twiddled signal by using a first symmetric rotation factor to obtain a pre-rotated signal, wherein the first symmetric rotation factor is a·$W_{4L}^{2p+1}$, p=0, K, L/2−1, wherein a is a constant real number, wherein L is the length of the input audio signal,
perform a Fast Fourier transform (FFT) of L/2 points on the pre-rotated signal to obtain an FFT signal,
perform an in-place fixed rotate compensation on the FFT signal,
post-rotate the signal that has undergone the in-place fixed rotate compensation by using a second symmetric rotate factor to obtain a post-rotated signal, wherein the second symmetric rotation factor is b·$W_{4L}^{2q+1}$, q=0, K, L/2−1, and b is a constant real number,
quantize a processed signal derived from the post-rotated signal to obtain a quantized signal, and
write the quantized signal into a bitstream for transmitting or storing.

8. The mobile phone according to claim 7, wherein the in-place fixed rotate compensation is performed by multiplying a fixed rotate compensation factor with the FFT signal.

9. The mobile phone according to claim 8, wherein the fixed rotate compensation factor is $$1 + j\left(\frac{3\pi}{4L}\right).$$

10. The mobile phone according to claim 7, wherein the twiddled signal is obtained according to z(p)=ℓ 2p)+j·ℓ L−1−2p), wherein z(p) denotes the twiddled signal, ℓ n) denotes the windowed time domain signal.

11. The mobile phone according to claim 7, wherein $W_{4L}^{2q+1}$ in the first symmetric rotation factor is expressed in the following form:

$$W_{4L}^{2p+1} = \cos\frac{2\pi(2p+1)}{4L} - j\sin\frac{2\pi(2p+1)}{4L}.$$

12. The mobile phone according to claim 7, wherein $W_{4L}^{2q+1}$ in the second symmetric rotation factor is expressed in the following form:

$$W_{4L}^{2p+1} = \cos\frac{2\pi(2p+1)}{4L} - j\sin\frac{2\pi(2p+1)}{4L}.$$

13. A method for processing an audio signal, the method comprising:
converting sound into an analog audio input signal;
converting the analog audio input signal into a digital audio signal;
obtaining a windowed time domain signal by windowing the digital audio signal;
obtaining a twiddled signal based on the windowed time domain signal;
pre-rotating the twiddled signal by using a first symmetric rotation factor to obtain a pre-rotated signal, wherein the first symmetric rotation factor is a·$W_{4L}^{2p+1}$, p=0, K, L/2−1, wherein a is a constant and is a real number, wherein L is the length of the input audio signal;
performing a Fast Fourier transform (FFT) of L/2 points on the pre-rotated signal to obtain an FFT signal;
performing an in-place fixed rotate compensation on the FFT signal;
post-rotating the signal that has undergone the in-place fixed rotate compensation by using a second symmetric rotation factor to obtain a post-rotated signal, wherein the second symmetric rotation factor is b·$W_{4L}^{2q+1}$, q=0, K, L/2−1, and b is a constant and is a real number;
obtaining a frequency domain signal based on the post-rotated signal;
quantizing a processed signal based on the frequency domain signal to obtain a quantized signal; and
writing the quantized signal into a bitstream for transmitting or storing.

14. The method according to claim 13, wherein the in-place fixed rotate compensation is performed by multiplying a fixed rotate compensation factor with the FFT signal.

15. The method according to claim 14, wherein the fixed rotate compensation factor is $$1 + j\left(\frac{3\pi}{4L}\right).$$

16. The method according to claim 13, wherein the twiddled signal is obtained according to z(p)=𝓍 2p)+j·𝓍 L−1−2p), wherein z(p) denotes the twiddled signal, 𝓍 n) denotes the windowed time domain signal.

17. The method according to claim 13, wherein $W_{4L}^{2q+1}$ in the first symmetric rotation factor is expressed in the following form:

$$W_{4L}^{2p+1} = \cos\frac{2\pi(2p+1)}{4L} - j\sin\frac{2\pi(2p+1)}{4L}.$$

18. The method according to claim 13, wherein $W_{4L}^{2q+1}$ in the second symmetric rotation factor is expressed in the following form:

$$W_{4L}^{2p+1} = \cos\frac{2\pi(2p+1)}{4L} - j\sin\frac{2\pi(2p+1)}{4L}.$$

19. The method according to claim 13, wherein the frequency domain signal is obtained by $$\begin{cases} y(2q) = \text{Re}\{\overline{Z}(q)\}, \\ y(L-1-2q) = -\text{Im}\{\overline{Z}(q)\} \end{cases}, q = 0, \ldots, L/2-1;$$

wherein y(2q) is the real parts of the post-rotated signal and denote the odd number frequency bins of the frequency domain signal, y(L−1−2q) is the imaginary parts of the post-rotated signal and denote the even number frequency bins of the frequency domain signal, and $$\overline{Z}(q) = (1 + j3\pi/4L) * W_{4L}^{2q+1} \sum_{p=0}^{L/2-1} \{z(p) * W_{4L}^{2p+1}\} W_{L/2}^{pq}.$$

20. A mobile phone, comprising:
a microphone, configured to convert sound into an analog audio input signal;
an analog-to-digital converter, configured to convert the analog audio input signal into a digital audio signal; and
an audio codec, configured to:
obtain a windowed time domain signal by windowing the digital audio signal,
obtain a twiddled signal based on the windowed time domain signal,
pre-rotate the twiddled signal by using a first symmetric rotation factor to obtain a pre-rotated signal, wherein the first symmetric rotation factor is a·$W_{4L}^{2p+1}$, p=0, K, L/2−1, wherein a is a constant and is a real number, wherein L is the length of the input audio signal,
perform a Fast Fourier transform (FFT) of L/2 points on the pre-rotated signal to obtain an FFT signal,
perform an in-place fixed rotate compensation on the FFT signal,
post-rotate the signal that has undergone the in-place fixed rotate compensation by using a second symmetric rotation factor to obtain a post-rotated signal, wherein the second symmetric rotation factor is b·$W_{4L}^{2q+1}$, q=0, K, L/2−1, and b is a constant and is a real number,
obtain a frequency domain signal based on the post-rotated signal,
quantize a processed signal based on the frequency domain signal to obtain a quantized signal, and
write the quantized signal into a bitstream for transmitting or storing.

21. The mobile phone according to claim 20, wherein the in-place fixed rotate compensation is performed by multiplying a fixed rotate compensation factor with the FFT signal.

22. The mobile phone according to claim 21, wherein the fixed rotate compensation factor is $$1 + j\left(\frac{3\pi}{4L}\right).$$

23. The mobile phone according to claim 21, wherein the twiddled signal is obtained according to z(p)=𝓍 2p)+j·𝓍 L−1−2p), wherein z(p) denotes the twiddled signal, 𝓍 n) denotes the windowed time domain signal.

24. The mobile phone according to claim 21, wherein $W_{4L}^{2q+1}$ in the first symmetric rotation factor is expressed in the following form:

$$W_{4L}^{2p+1} = \cos\frac{2\pi(2p+1)}{4L} - j\sin\frac{2\pi(2p+1)}{4L}.$$

25. The mobile phone according to claim 21, wherein $W_{4L}^{2q+1}$ in the second symmetric rotation factor is expressed in the following form:

$$W_{4L}^{2p+1} = \cos\frac{2\pi(2p+1)}{4L} - j\sin\frac{2\pi(2p+1)}{4L}.$$

26. The mobile phone according to claim 21, wherein the frequency domain signal is obtained by $$\begin{cases} y(2q) = \text{Re}\{\overline{Z}(q)\}, \\ y(L-1-2q) = -\text{Im}\{\overline{Z}(q)\} \end{cases}, q = 0, K, L/2-1;$$

wherein y(2q) is the real parts of the post-rotated signal and denote the odd number frequency bins of the frequency domain signal, y(L−1−2q) is the imaginary parts of the post-rotated signal and denote the even number frequency bins of the frequency domain signal, and $$\overline{Z}(q) = (1 + j3\pi/4L) * W_{4L}^{2q+1} \sum_{p=0}^{L/2-1} \{z(p) * W_{4L}^{2p+1}\} W_{L/2}^{pq}.$$

* * * * *